(12) United States Patent
Ballaguet et al.

(10) Patent No.: US 10,106,410 B2
(45) Date of Patent: Oct. 23, 2018

(54) ENHANCEMENT OF CLAUS TAIL GAS TREATMENT BY SULFUR DIOXIDE-SELECTIVE MEMBRANE TECHNOLOGY

(71) Applicant: Saudi Arabian Oil Company, Dhahran (SA)

(72) Inventors: Jean-Pierre R. Ballaguet, Dhahran (SA); Milind M. Vaidya, Dhahran (SA); Iran D. Charry-Prada, Dhahran (SA); Sebastien A. Duval, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/455,847

(22) Filed: Mar. 10, 2017

(65) Prior Publication Data

US 2018/0257935 A1 Sep. 13, 2018

(51) Int. Cl.
| | | |
|---|---|---|
| *C01B 17/04* | (2006.01) | |
| *B01D 53/86* | (2006.01) | |
| *B01D 53/48* | (2006.01) | |
| *B01D 53/76* | (2006.01) | |
| *B01D 53/22* | (2006.01) | |

(Continued)

(52) U.S. Cl.
CPC ........ *C01B 17/0413* (2013.01); *B01D 53/228* (2013.01); *B01D 53/229* (2013.01);
(Continued)

(58) Field of Classification Search
CPC ...... B01D 53/48; B01D 53/50; B01D 53/504; B01D 53/74; B01D 61/38; B01D 63/00;
(Continued)

(56) References Cited

U.S. PATENT DOCUMENTS

| | | |
|---|---|---|
| 3,199,955 A | 8/1965 | Conroy et al. |
| 3,503,186 A | 3/1970 | Ward |

(Continued)

FOREIGN PATENT DOCUMENTS

| | | | |
|---|---|---|---|
| CN | 102942162 A | 2/2013 | |
| CN | 102989268 A | 3/2013 | |
| DE | 102007002511 A1 * | 7/2008 | ............. C01B 17/56 |

OTHER PUBLICATIONS

Amo et al. "Low-Quality Natural Gas Sulfur Removal/Recovery" BY MTR Membrane Technology and Research, Inc.; DOE Report Contract No. DE-AC21-92MC28133-01 Jan. 29, 1998; (pp. 1-107).
(Continued)

*Primary Examiner* — Timothy C Vanoy
(74) *Attorney, Agent, or Firm* — Bracewell LLP; Constance Gall Rhebergen

(57) ABSTRACT

A method for increasing sulfur recovery from an acid gas feed comprising the steps of introducing the acid gas feed and a sulfur dioxide enriched air stream to a Claus process to produce a product gas stream, introducing the product gas stream to a thermal oxidizer to produce a flue gas stream, cooling the flue gas stream to produce a cooled take-off stream, separating the cooled take-off stream into a saturated gas stream, heating the saturated gas stream to produce a membrane gas stream, introducing the membrane gas stream to a membrane sweeping unit, the membrane sweeping unit comprises a membrane, the sulfur dioxide in the membrane gas stream permeates the membrane of the membrane sweeping unit, introducing a sweep air stream, the sweep air stream collects the sulfur dioxide to create the sulfur dioxide enriched air stream.

14 Claims, 4 Drawing Sheets

(51) Int. Cl.
　　　*B01D 53/26*　　　(2006.01)
　　　*B01D 53/96*　　　(2006.01)
(52) U.S. Cl.
　　　CPC .......... *B01D 53/265* (2013.01); *B01D 53/48* (2013.01); *B01D 53/76* (2013.01); *B01D 53/8615* (2013.01); *B01D 53/96* (2013.01); *C01B 17/0447* (2013.01)
(58) Field of Classification Search
　　　CPC ............... B01D 65/00; B01D 2252/30; B01D 2257/302; B01D 2257/304; B01D 2311/00; B01D 53/22; C01B 17/0404; C01B 17/60; C10L 3/101; C10L 3/103; C10G 70/045
　　　See application file for complete search history.

(56)　　　　　　References Cited

U.S. PATENT DOCUMENTS

| | | | |
|---|---|---|---|
| 3,819,806 | A | 6/1974 | Mayer et al. |
| 3,928,547 | A | 12/1975 | Wilkalis et al. |
| 4,039,650 | A | 8/1977 | Daley |
| 4,089,653 | A | 5/1978 | Ward, III |
| 4,117,100 | A | 9/1978 | Hellmer et al. |
| 5,002,743 | A | 3/1991 | Kokkonen et al. |
| 5,071,451 | A | 12/1991 | Wijmans |
| 5,089,033 | A | 2/1992 | Wijmans |
| 5,129,921 | A | 7/1992 | Baker et al. |
| 5,147,550 | A | 9/1992 | Wijmans et al. |
| 5,199,962 | A * | 4/1993 | Wijmans ............... B01D 53/22 95/39 |
| 5,205,843 | A | 4/1993 | Kaschemekat et al. |
| 5,256,295 | A | 10/1993 | Baker et al. |
| 5,256,296 | A | 10/1993 | Baker et al. |
| 5,306,476 | A | 4/1994 | Jalan et al. |
| 5,374,300 | A | 12/1994 | Kaschemekat et al. |
| 5,445,669 | A | 8/1995 | Nakabayashi et al. |
| 5,558,698 | A | 9/1996 | Baker et al. |
| 5,755,855 | A | 5/1998 | Baker et al. |
| 5,851,265 | A | 12/1998 | Burmaster et al. |
| 8,524,189 | B2 | 9/2013 | Chatterjee et al. |
| 8,574,539 | B2 | 11/2013 | Schoonebeek et al. |
| 8,658,116 | B2 * | 2/2014 | Milam ................... C01B 17/508 208/208 R |
| 9,593,015 | B2 | 3/2017 | Ballaguet et al. |
| 2004/0120874 | A1 | 6/2004 | Zauderer |
| 2010/0264065 | A1 * | 10/2010 | Hamad ................ B01D 61/362 208/87 |
| 2012/0027656 | A1 | 2/2012 | Schaffer et al. |
| 2012/0042778 | A1 * | 2/2012 | Jung ................... B01D 53/1481 95/181 |
| 2013/0123556 | A1 * | 5/2013 | Milam ................... C01B 17/508 585/310 |
| 2015/0328583 | A1 * | 11/2015 | Zhou .................... B01D 53/226 585/818 |
| 2016/0131423 | A1 * | 5/2016 | Chambron .............. C01B 3/506 62/617 |

OTHER PUBLICATIONS

Froschauer, C., et al. "No matter of course: Ionic liquids as SO2-selective gas absorbers." (2013). pp. 30-43.

Hu, Xing-Bang, et al. "Impact of a-d-glucose pentaacetate on the selective separation of CO 2 and SO 2 in supported ionic liquid membranes." Green Chemistry 14.5 (2012): 1440-1446.

Huang, Kuan, et al. "Facilitated separation of CO 2 and SO 2 through supported liquid membranes using carboxylate-based ionic liquids." Journal of Membrane Science 471 (2014): 227-236.

Jiang, Yingying, et al. "Permeability and selectivity of sulfur dioxide and carbon dioxide in supported ionic liquid membranes." Chinese Journal of Chemical Engineering 17.4 (2009): 594-601.

Kim et al. "Separation performance of PEBAX/PEI hollow fiber composite membrane for SO 2/CO 2/N 2 mixed gas." Chemical Engineering Journal 233 (2013): 242-250.

Luis, et al. "Zero solvent emission process for sulfur dioxide recovery using a membrane contactor and ionic liquids." Journal of Membrane Science 330.1 (2009): 80-89.

Luis, et al. "Sulfur dioxide non-dispersive absorption in N, N-dimethylaniline using a ceramic membrane contactor." Journal of chemical technology and biotechnology 83.11 (2008): 1570-1577.

Shen, J-N et al. "Preparation of a facilitated transport membrane composed of carboxymethyl chitosan and polyethylenimine for CO2/N2 separation." International journal of molecular sciences 14.2 (2013): 3621-3638.

Toy et al. "CO2 Capture Membrane Process for Power Plant Flue Gas." DOE Cooperative Agreement No. DE-NT0005313, and R. T. I. International. (2012). pp. 1-76.

Turk, B. S., et al. "Novel technologies for gaseous contaminants control." Contract DE-AC26-99FT40675 for US DOE by Research Triangle Institute, Research Triangle Park, North Carolina, Sep. (2001). (pp. 1-122).

Orme, et al., "Mixed gas hydrogen sulfide permeability and separation using supported polyphosphazene membranes", Journal of Membrane Science 253 (2005) 243-249.

Kuehne, et al., "Selective Transport of Sulfur Dioxide through Polymer Membranes. 1. Polyacrylate and Cellulose Triacetate Single-Layer Membranes", Ind. Eng. Chem. Process Des. Dev., 1980, 19 (4), pp. 609-616.

Ren, et al., "Poly(amide-6-b-ethylene oxide) membranes for sour gas separation", Separation and Purification Technology 89 (2012) 1-8.

Ren, et al., "Poly (amide-6-b-ethylene oxide) multilayer composite membrane for carbon dioxide separation", International Journal of Greenhouse Gas Control 8 (2012) 111-120.

Jiang, et al., "SO2 Gas Separation Using Supported Ionic Liquid Membrane", J. Phys. Chem. B, 2007, 111 (19), pp. 5058-5061.

Dytnerskii, et al., "SO2 Separation from Gaseous Mixtures by membranes" Journal of Membrane Science, 41 (1989) 49-54.

Scholes, et al., "Effects of Minor Components in Carbon Dioxide Capture Using Polymeric Gas Separation Membranes", Separation & Purification Reviews, 38:1, 1-44, (2009).

Kim, et al., "Hollow fiber membrane process for SO2 removal from flue gas", J Chem Technol Biotechnol (2014), doi: 10.1002/jctb.4310.

Turk, et al., High-Temperature/High-Pressure (HTHP) Membrane Testing, Characterization of NCSU Polymer Samples, Novel Technologies for Gaseous Contaminants Control, Final Report for the Base Program, Control-Doe-for-US-Dept-of-Energy,Chapter 2.5.4 (2-27), Oct. 1, 1999 to Sep. 30, 2001.

* cited by examiner

ENHANCEMENT OF CLAUS TAIL GAS TREATMENT BY SULFUR DIOXIDE-SELECTIVE MEMBRANE TECHNOLOGY

FIELD OF THE INVENTION

This invention relates to a system and method for improving sulfur recovery from a Claus unit. More specifically, this invention provides a system and method for treating acid gas streams and minimizing sulfur dioxide emissions therefrom.

BACKGROUND OF THE INVENTION

As part of natural gas processing and hydro-treatment of oil fractions, a large amount of hydrogen sulfide ($H_2S$) is produced. The $H_2S$ is toxic and therefore is converted to elemental sulfur (S), which is a more practical and safer state for handling and transportation. With more stringent fuel regulations and increasing environmental concerns, together with the need to process sourer crude oils and natural gases, sulfur recovery has become one of the leading issues in emission reduction. Elemental sulfur is the ultimate state of recovery of the sulfur species.

The conversion of $H_2S$ into elemental sulfur is performed in a sulfur recovery unit (SRU). The level of sulfur recovery is increasingly important as the need to minimize the amount of sulfur compounds released to atmosphere from the recovery unit needs to be reduced in order to meet the mandated legal limits. The most common process used in the world, for this conversion, is known as the modified Claus treatment process or alternately the Claus unit or modified Claus unit.

The modified Claus treatment process is a combination of thermal and catalytic processes that are used for converting gaseous $H_2S$ into elemental sulfur.

Claus unit feed gases have a wide range of compositions. Most of the feed gases originate from absorption processes using various solvents (amine, physical or hybrid solvents) to extract hydrogen sulfide from the by-product gases of petroleum refining, natural gas processing, and also tar sands, coal gasification and other industries. The other gas plants or refinery source of $H_2S$ is the sour water stripper unit.

The first process is a thermal process (i.e., in the absence of catalyst) in a reaction furnace. The feed gas to the Claus unit is burned in the reaction furnace using sufficient combustion air, or oxygen enriched air to burn a stoichiometric one-third of the contained $H_2S$. The reaction furnace pressure is maintained at about 1.5 bars (35-70 KPa above atmospheric pressure) and the temperature is maintained at about 900-1,250° C. in a "no-preheat" operation case. The $H_2S$ from the feed gas is thermally converted into elemental sulfur, along with sulfur dioxide ($SO_2$). Sulfur yield is around 65%-72% depending on the operation mode of the SRU. Increasing the elemental sulfur yield in the reaction furnace and subsequently the condenser is advantageous as it reduces the later load on the catalytic reactors. The reaction furnace operation is designed to maximize sulfur recovery in consideration of the feed composition, by adjusting air/oxygen feed, reaction temperature, pressure, and residence time. In addition, the reaction furnace can destroy contaminants, such as hydrocarbons, that are present in the feed gas stream. Such contaminants pose problems for the catalytic reactors through the development of carbon-sulfur compounds that can lead to plugging or deactivation of the catalyst beds.

The hot reaction product gas from the reaction furnace, containing sulfur vapor, is used to produce high pressure steam in a waste heat boiler, which also results in cooling the gas. The product gas is then further cooled and condensed in a heat exchanger, while producing additional low pressure steam. The condensed liquid sulfur is separated from the remaining unreacted gas in the outlet end of the condenser and sent to a sulfur pit or other collection area.

The separated gas then enters the catalytic process of the Claus unit. The catalytic process contains between two and three catalytic reactors. Following the sulfur condenser, the separated gas is reheated and enters the first catalytic reactor, which is maintained at an average temperature of about 305° C. In the first catalytic reaction about 20% of the $H_2S$ in the feed gas is converted into elemental sulfur through a reaction with the $SO_2$. The temperature is limited by the exit temperature to avoid catalytic bed damages and thermodynamic considerations. The outlet product gas from the first catalytic reactor is cooled, in a second condenser, which can also produce steam. Again, the condensed liquid sulfur is separated from the remaining unreacted gas in the outlet end of the second condenser and sent to sulfur storage. The separated gas from the second condenser is sent to another re-heater and the sequence of gas reheat, catalytic reaction, condensation and separation of liquid sulfur from unreacted gas is repeated for the second and third catalytic reactors at successively lower reactor temperatures. About 5% and 3% of the $H_2S$ in the feed gas are converted into elemental sulfur respectively in the second reactor and third reactors.

Finally, the gas stream is released to atmosphere via a stack after passing through an incinerator which oxidizes any remaining sulfur species into $SO_2$. In addition, the flue gas compounds include water, nitrogen, oxygen, sulfide dioxide and eventually carbon dioxide. The eventual presence of carbon dioxide results from the acid gas composition ($CO_2$ and $H_2S$ are recovered from natural gas during a sweetening process, such as an amine process). Incinerator temperature and gas temperature in the refractory lined stack are high enough (far above gas dew point) to avoid corrosion and help with quick $SO_2$ dissemination in the surrounding air. Moreover, the stack is designed to make sure $SO_2$ concentration at ground level is below the local regulatory limit.

For a well-designed and well-operated Claus sulfur recovery plant having three catalytic reactors, an overall sulfur conversion of 96-98% can be achieved depending on the feed gas composition. To achieve higher conversion, a tail gas treatment unit must be added to further process the exhaust gas upstream of or as an alternative to an incinerator. Tail gas treatment units are polishing units. Currently available tail gas treatment units can be effective at achieving up to 99.2% recovery, but can add significant capital cost to the Claus treatment unit, often on the same order of magnitude as the Claus unit itself.

Several types of tail gas treatment technologies have been developed and include the Scot® process, Highsulf™, BSR/MDEA™, Sultimate™, Bechtel TGTU, and Technip TGTU. The choice of tail gas treatment unit installed depends on the conversion targeted as cost is directly linked to the required conversion level. While the Scot process can reach 99.9% sulfur recovery, the added cost and unit complexity makes this process unfeasible when the Claus feed is not highly concentrated with hydrogen sulfide, e.g., unless greater than 55%. In addition to increase operating and capital costs, these technologies can require significant physical footprint for the various process vessels, columns, pumps, and storage vessels necessary for operation.

Additionally, processes can be added as an alternative to tail gas treatment units to target $SO_2$ for removal. There are many techniques that have been developed to process exhaust gas in order to reduce sulfur oxide emissions from combusted gas streams. The techniques are generally divided into regenerative processes and non-regenerative processes and can be further divided into wet processes and dry processes.

Non-regenerative processes include a variety of wet-scrubbing processes, such as a limestone-gypsum process and are the leading technologies when high efficiency $SO_2$ removal is targeted at relatively low fcost. In a limestone-gypsum process, flue gas enters an absorber tower and bubbles through a spray of limestone and water, where the $SO_2$ reacts with the lime to create calcium sulfite, which reacts with oxygen to produce gypsum, which can then be disposed. The unreacted gases then exit the top of the tower. The spray tower predominates in the wet desulfurization systems and technologies.

For regenerative processes, the sorbent is reused after thermal or chemical treatment to produce concentrated $SO_2$, which is usually converted to elemental sulfur. These are complex processes requiring high capital outlays and include the magnesium oxide process and Wellman-Lord process. On the dry process side, regenerative processes include the use of activated carbon.

More recently, regenerative processes utilize solvent technologies. Examples of such technologies include: LAB-SORB™, CANSOLV®, ClausMaster™, and Clintox®.

In most cases, flue gas is not saturated. However, before acid gases such as $SO_2$ can be removed, the gas stream must be adiabatically saturated or "quenched." Most scrubbers will have a section where liquid (typically water or the scrubbing reagent itself) is contacted with the incoming flue gas to adiabatically saturate, or "quench," the gas stream.

The LAB-SORB™ process utilizes an inorganic regenerable scrubbing reagent to react with $SO_2$. The reagent, rich in $SO_2$ from the scrubber, is processed in a regeneration unit to strip off the captured $SO_2$, producing fresh reagent for scrubbing. The $SO_2$ removed from the reagent is discharged as concentrated/pure $SO_2$ (90+%) and can be sent to the front end of a Claus plant (or sulfuric acid plant) for recovery. Solids are removed from the flue gas in a pre-scrubbing section and de-watered in a system similar to what is used in the purge treatment unit of caustic soda based FCCU scrubbing system. Caustic soda (NaOH) and phosphoric acid ($H_3PO_4$) are used for the buffer and small additions are required to make up for small buffer loses. Low pressure steam is used for buffer regeneration in single or double effects evaporation loop. The LAB-SORB' process produces a minimum amount of waste for disposal, while recovered $SO_2$ can be converted to saleable products such as elemental sulfur, sulfuric acid or liquid SO2. The LAB-SORB' system can be adapted to many processes, including fossil fuel fired boilers, Claus Tail Gas Treatment, FCCU, Non Ferrous Smelters, Sulfuric Acid Plants, and other $SO_2$ emitting facilities.

The CANSOLV® system is similar to the amine treatment process for removal of $H_2S$ and $CO_2$ from refinery streams and natural gas. The gas is contacted counter currently in the absorption tower, where the CANSOLV® solvent absorbs the sulfur dioxide, reducing the effluent gas down to the design $SO_2$ concentration. The rich amine accumulates in the absorption sump. A constant stream of the CANSOLV® solvent (based on a sterically hindered diamine) is withdrawn from the absorption sump to be regenerated in the stripping tower. Once regenerated, the solvent is recirculated to the absorption tower to pick up additional $SO_2$. Emissions as low as 10 ppmV can be achieved. The main part of the CANSOLV® process consists of a structured packing absorption tower and a regeneration tower, also containing structured packing, equipped with a reboiler and an overhead condenser. Associated peripheral equipment consists of process pumps, heat exchangers, and a process particulate filter. The unit also includes an electro dialysis solvent purification unit. Materials of construction are adjusted to handle the lower pH values resulting from the higher acidity of $SO_2$ compared to $H_2S$ and $CO_2$. More specifically, stronger acids such as sulfuric and hydrochloric are not released in the regeneration column, ensuring that the product $SO_2$ is of high purity.

In the CLAUSMASTER® process hot $SO_2$ gas is cooled by a DynaWave® wet scrubber and gas cooling tower. $SO_2$ removal occurs only after the $SO_2$ gas has been quenched. This is accomplished in two steps: The acid gases are absorbed into the scrubbing liquid. Once absorbed, the acid gases react with the reagent, forming reaction by-products, which then must be removed from the clean gas. After passing through the proprietary $SO_2$ physical absorbent, clean gas exits the stack and the $SO_2$ is stripped from the $SO_2$ loaded absorbent in the stripping tower. Concentrated $SO_2$ is recycled back to the Claus sulfur recovery plant. The recycled $SO_2$ reduces the air and fuel requirements for a typical Claus plant and $H_2S$ tail gas system. This process is not very popular in refineries or gas plants as it adds complexity to existing unit. This process is used for smelters where concentrated $SO_2$ is directed to $H_2SO_4$ production as this chemical is being used in the metal manufacturing process.

The CLINTOX® and SOLINOX® process is a physical scrubber process. The completely oxidized tail gas containing only $SO_2$ is fed to a physical scrubbing tower. The concentrated $SO_2$ is stripped from the solvent in a second column and sent back to the Claus inlet. One advantage of CLINTOX® physical scrubbing is that whatever the feed gas $SO_2$ concentration is, the residual $SO_2$ in the flue is always constant because of the higher solubility of $SO_2$ in the scrubbing solution with higher concentrations in the CLINTOX® feed gas. This self-regulation allows the Claus plant to be less sophisticated and therefore, less expensive. With such a tail gas clean-up process, sulfur recovery rates of nearly 100% are attainable with approximately 80 ppmV residual $SO_2$ in the exhaust gas.

The LAB-SORB™, CANSOLV®, CLAUSMASTER®, CLINTOX® and SOLINOX® are all useful systems and processes useful when the target is to produce $H_2SO_4$ from $SO_2$. However, when combined with the conventional Claus process, these processes increase the complexity of the system by requiring additional equipment and materials. In addition, the processes and systems require increases in energy use. Finally, all of these processes produce waste streams that require removal and processing.

Another type of scrubbing system is using caustic/sodium sulfite solution to capture $SO_2$ from catalytically oxidized sulfur species. Such a system processes lean acid gas over a catalyst which oxidizes the $H_2S$ to $SO_2$ at a temperature of about 700° F. This is desirable for low $SO_2$ emissions as produced sodium sulfite has to be disposed in the waste water system.

Regardless of which scrubbing technology is selected, one downside of scrubbers is that they all must have a method for removing the water droplets and reaction by-products from the gas before they exit the scrubber. In addition, the processes need to provide removal of particulates in addition to acid gas removal. Most wet gas scrubbers will remove some particulates. However, another piece of equipment, such as a venturi scrubber, is often required to accomplish significant removal of particulates.

Therefore, a process which minimizes $SO_2$ being released to atmosphere without requiring excessive amounts of energy, equipment and materials, or process shutdown is desired. Preferably, such a process, would maintain the overall sulfur capacity of the Claus unit, while increasing the overall sulfur recovery efficiency.

SUMMARY OF THE INVENTION

This invention relates to a system and method for improving sulfur recovery from a Claus unit. More specifically, this invention provides a system and method for treating acid gas streams and minimizing sulfur dioxide emissions therefrom.

In one aspect of the present invention, a method for increasing sulfur recovery from an acid gas feed is provided. The method includes the steps of introducing the acid gas feed and a sulfur dioxide enriched air stream to a Claus process to produce a product gas stream and a recovered sulfur stream, wherein the acid gas feed includes hydrogen sulfide, wherein the hydrogen sulfide is present in a hydrogen sulfide concentration, wherein the sulfur dioxide enriched air stream includes sulfur dioxide and air, introducing the product gas stream to a thermal oxidizer to produce a flue gas stream, the thermal oxidizer configured to convert sulfur containing compounds in the product gas stream to sulfur dioxide, cooling the flue gas stream in a cooler to produce a cooled take-off stream, separating the cooled take-off stream in a liquid-gas separation unit to produce a condensed water and a saturated gas stream, wherein the saturated gas stream includes sulfur dioxide, heating the saturated gas stream in a heater to produce a membrane gas stream, introducing the membrane gas stream to a membrane sweeping unit, wherein the membrane sweeping unit includes a membrane, wherein the membrane sweeping unit is configured to produce a sulfur dioxide depleted stream, wherein the sulfur dioxide in the membrane gas stream permeates the membrane of the membrane sweeping unit to a permeate side, and introducing a sweep air stream to the permeate side of the membrane sweeping unit, wherein the sweep air stream collects the sulfur dioxide that permeates the membrane of the membrane sweeping unit to create the sulfur dioxide enriched air stream.

In certain aspects of the invention, the method further includes the step of feeding the sulfur dioxide depleted stream to an incinerator stack. In certain aspects of the invention, the method further includes the steps of heating the sulfur dioxide depleted stream in a reheater to produce a heated stack feed, wherein the heated stack feed is at a stack temperature, and feeding the heated stack feed to an incinerator stack. In certain aspects of the invention, the membrane is an [emim][BF4] ionic liquid supported on a polyethersulfone. In certain aspects of the invention, the membrane is selected from the group consisting of polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117, rubbery Nafion®, sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes. In certain aspects of the invention, the hydrogen sulfide concentration is greater than 25%. In certain aspects of the invention, the sulfur recovery is greater than 99.2%.

In a second aspect of the invention, an apparatus for increasing sulfur recovery from an acid gas feed is provided. The apparatus includes a Claus process, the Claus process configured to receive the acid gas feed and a sulfur dioxide enriched air stream to produce a product gas stream and a recovered sulfur stream, wherein the acid gas feed includes hydrogen sulfide, wherein the hydrogen sulfide is present in a hydrogen sulfide concentration, wherein the sulfur dioxide enriched air stream includes sulfur dioxide, and air, wherein the product gas stream includes sulfur containing compounds, a thermal oxidizer, the thermal oxidizer configured to convert the sulfur containing compounds to sulfur dioxide to produce a flue gas stream, wherein the flue gas stream includes sulfur dioxide, water vapor, oxygen, nitrogen, and carbon dioxide, a cooler, the cooler configured to reduce the temperature of the flue gas stream below the dew point temperature of water to produce a cooled take-off stream, a gas-liquid separator unit, the gas-liquid separator unit configured to condense the water vapor in the cooled take-off stream to produce a condensed water and a saturated gas stream, wherein the saturated gas stream includes sulfur dioxide, a heater, configured to heat the saturated gas stream to produce a membrane gas stream, and a membrane sweeping unit, wherein the membrane sweeping unit includes a membrane, wherein the membrane sweeping unit is configured to produce a sulfur dioxide depleted stream, wherein the sulfur dioxide in the membrane gas stream permeates the membrane of the membrane sweeping unit to a permeate side, wherein a sweep air stream fed to the permeate side of the membrane sweeping unit is operable to collect the sulfur dioxide that permeates the membrane of the membrane sweeping unit to create the sulfur dioxide enriched air stream.

In certain aspects of the invention, the apparatus further includes an incinerator stack, the incinerator stack configured to disseminate the sulfur dioxide depleted stream to the atmosphere. In certain aspects of the invention, the membrane is an [emim][BF4] ionic liquid supported on a polyethersulfone. In certain aspects of the invention, the membrane is selected from the group consisting of polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117, rubbery Nafion®, sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes. In certain aspects of the invention, the hydrogen sulfide concentration is greater than 25%. In certain aspects of the invention, the sulfur recovery is greater than 99.2%.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1:
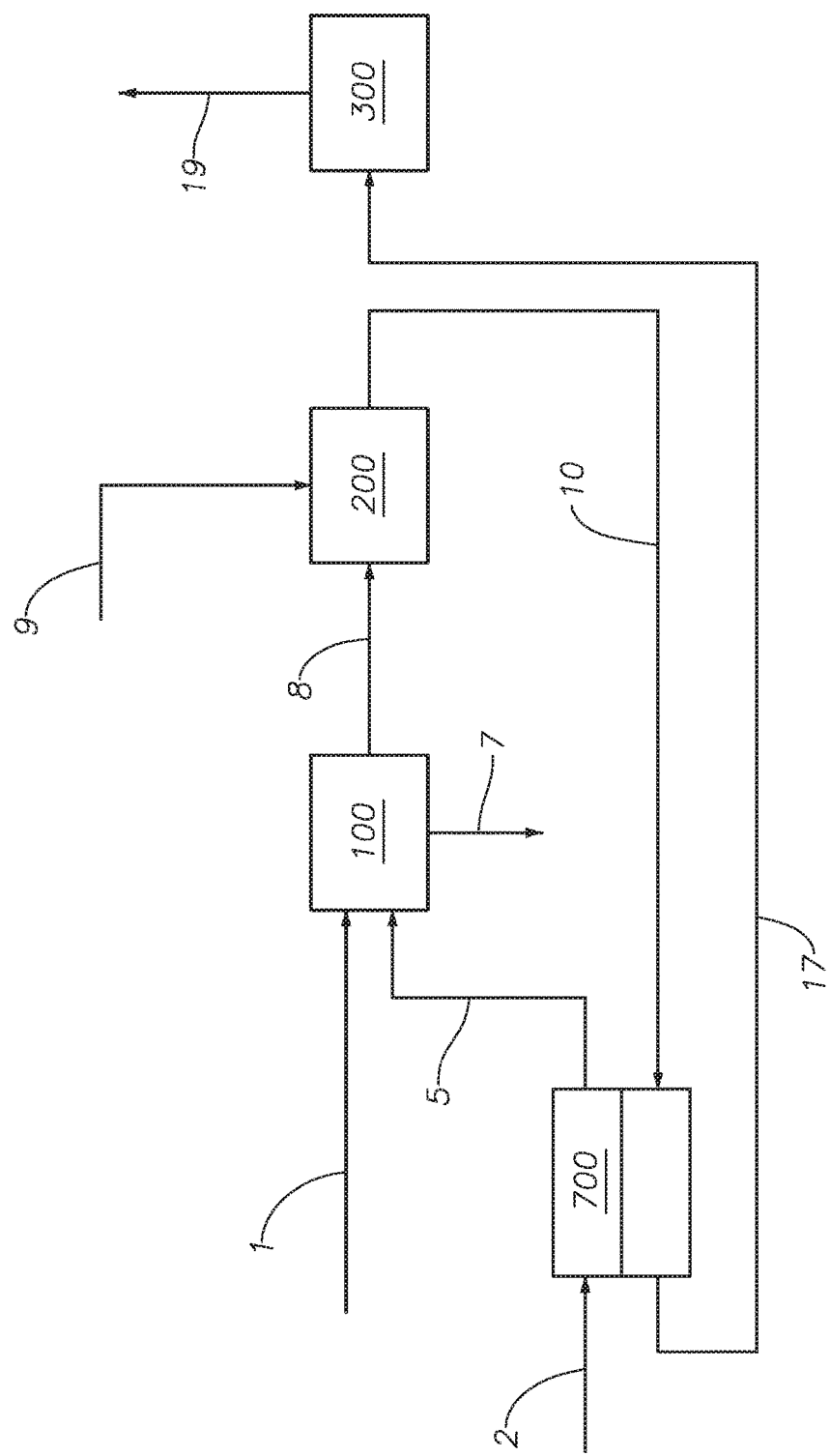
FIG. 1 is a process flow diagram of the process of the invention.

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

According to a method of the invention, $SO_2$ is removed from a tail gas stream containing $CO_2$, $H_2O$, $N_2$ and $O_2$ using a $SO_2$-selective membrane. In at least one instance of the present invention, the air feed supplied to the reaction furnace of the Claus unit sweeps the permeate side of the $SO_2$-selective membrane prior to being supplied to the Claus furnace, in doing so the air feed becomes a $SO_2$-enriched air feed to the reaction furnace. "Sweep" as used herein means that the stream passes continuously by the membrane, such that the permeate does not sit statically against the permeate side of the membrane, such that the sweep provides the driving force of the permeate. The air sweep lowers the $SO_2$ concentration on the permeate side of the membrane, thereby causing more $SO_2$ to be drawn into the membrane from the flue gas stream and sent, along with the air sweep, to the Claus unit. With the air sweep, the $SO_2$ concentration on the permeate side is lower than the $SO_2$ on the feed side of the membrane. The air sweep and the $SO_2$-enriched air feed recovers a fraction of the $SO_2$ that would otherwise have been released to the atmosphere through an incinerator stack, and by recovering the $SO_2$ and directing the $SO_2$-enriched air feed to the Claus furnace, the process provides controlled slippage of $SO_2$ to the atmosphere at the incinerator stack in order to meet environmental regulations or other process targets. In at least one instance of the present invention, the use of the $SO_2$-selective membrane minimizes $SO_2$ emissions from an incinerator stack. In one instance of the invention, the $SO_2$-selective membrane recovers sulfur dioxide from the exhaust gas of the thermal oxidizer before the exhaust gas is fed to an incinerator stack. The recovered sulfur dioxide is collected by sweeping the permeate side with an air stream, which creates a sulfur dioxide rich air stream. The sulfur dioxide rich air stream can be fed to the reaction furnace of the Claus process, along with a raw air feed, and an acid gas stream. In at least one instance of the present invention, the use of the $SO_2$-selective membrane improves the Claus unit operability and efficiency to maximize elemental sulfur recovery and minimizes $SO_2$ emissions from an incinerator stack. In at least one instance of the present invention, the $SO_2$-selective membrane can be retrofitted to an existing Claus unit or modified Claus process, regardless of the Claus unit and tail gas treatment unit. In at least one instance of the present invention, the $SO_2$-selective membrane can be a substitute for a tail gas treatment unit, being installed between the thermal oxidizer and the incinerator stack, and has the advantage of minimizing additional mechanical features by avoiding the need for additional rotating equipment, such as blowers.

The use of the $SO_2$-selective membrane is based upon gas component separation with membranes that exhibit durable high $SO_2/CO_2$ and $SO_2/N_2$ selectivity. These selective membranes minimize recirculation of inert gases potentially present in the flue gas, such as $CO_2$ and $N_2$. The membrane produces a $SO_2$-concentrated permeate fraction, which is fed to the reaction furnace of the Claus unit along with the air supply. The membrane also produces an $SO_2$-depleted reject (retentate) fraction, mainly containing inert gases, which are released to the atmosphere.

Referring to FIG. 1, acid gas feed 1 is introduced to Claus process 100 along with sulfur dioxide enriched air stream 5. Acid gas feed 1 can be any source of acid gas or sour gas, containing $H_2S$, $CO_2$, and combinations thereof. Acid gas feed 1 contains $H_2S$ in an amount greater than 25% by weight on a dry basis, alternately greater than 40% by weight on a dry basis, alternately greater than 55% by weight on a dry basis, alternately greater than 70% by weight on a dry basis, greater than 75% by weight on a dry basis, alternately greater than 80% by weight on a dry basis, and alternately greater than 99% by weight on a dry basis. As used herein "on a dry basis" means as calculated without water or water vapor.

Claus process 100 is a Claus process or modified Claus process, a known process for recovering elemental sulfur from $H_2S$, through combustion and catalytic reactions that includes a thermal stage, such a reaction furnace (not shown), and a catalytic stage, such as catalytic reactors (not shown). Claus process 100 produces recovered sulfur stream 7 and product gas stream 8. Recovered sulfur stream 7 is a liquid stream of elemental sulfur sent to storage or a sulfur pit for further use or processing. Without being bound to a particular theory, it is believed that the stable form of sulfur that can be separated as a liquid from the process is $S_8$. Product gas stream 8 includes sulfur containing compounds $SO_2$, $CO_2$, air ($O_2$, $N_2$, and Argon (Ar)), and water vapor ($H_2O$). As used herein, "sulfur containing compounds" includes $H_2S$ and other sulfur containing compounds. Product gas stream 8 enters thermal oxidizer 200 along with thermal oxidizer air feed 9 to generate flue gas stream 10.

Thermal oxidizer 200 can be any thermal oxidizer capable of providing a combustion temperature to convert the sulfur containing compounds, including $H_2S$, in product gas stream 8 into $SO_2$. Thermal oxidizer air feed 9 can be any source of air, oxygen, or oxygen-enriched air. Thermal oxidizer air feed 9 can be the same source of air as air feed 2. Thermal oxidizer air feed 9 is fed to thermal oxidizer 200 in excess of the volume necessary to combust the remaining $H_2S$ and other sulfur containing compounds in product gas stream 8, such that flue gas stream 10 contains $SO_2$, $O_2$, $N_2$, $CO_2$, $H_2O$, and combinations thereof. Flue gas stream 10 can contain other inert gases present in air. Flue gas stream 10 is introduced to membrane sweeping unit 700.

Membrane sweeping unit 700 is any membrane capable of separating sulfur dioxide from flue gas stream 10. Polymeric membranes are able to separate one or more gases from a feed mixture generating a permeate containing a specific gas enriched stream. Membrane permeability characterizes performance and is dictated by flux and selectivity for a specific gas molecule. Separation is dependent on the physical-chemical interaction of gases with the polymeric membrane. Permeability is expressed in GPU (Gas Permeation Units) or barrer. Exemplary membranes include membranes made from polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117, rubbery Nafion®, sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes.

Ionic liquid membranes are membranes that are doped with liquid ionic compounds. Preferably, the liquid ionic compounds have non-nucleophilic anions, such non-nucleophilic anions increase the $SO_2$ content in the permeate by preferential solubility, permeability and selectivity of the components in the LICs. The use of LICs in membrane sweeping unit 700 takes advantage of low vapor pressure which avoids the loss of the liquids due to evaporation from the pores of the membrane and the preferential solubility of $SO_2$ in ionic liquids. Exemplary SILM membranes include membranes impregnated with carboxylate-based ILs (including mono-carboxylates and dicarboxylates), membranes impregnated with 1-butyl-3-methylimidazolium 2-formylbenzenesulfonate (BMIM OFBS), membranes impregnated with 1-allyl-3-methylimidazolium 2-formylbenzenesulfonate (AMIM OFBS), [N222] [dimalonate] IL supported on polyethersulfone (PES), and [emim][BF4] IL supported on polyethersulfone (PES).

In at least one embodiment of the present invention, membrane sweeping unit 700 is a [emim][BF4] ionic liquid supported on a polyethersulfone. An [emim][BF4] ionic liquid supported on a polyethersulfone type membrane has increased $SO_2$ permeability due to the presence of the active carrier, [emim][BF4] ionic liquid.

One of skill in the art will appreciate that the size, permeability, and selectivity of membrane sweeping unit 700 are design features based on the requirements of the system. While in general the larger the surface area, the greater the recovery, there is a tipping point at which the economics make it unfeasible to increase the surface area of the membrane. The type of membrane selected is in consideration of the desired permeability and selectivity of the membrane and the acid gas feed composition.

Flue gas stream 10 contacts membrane sweeping unit 700. $SO_2$ in flue gas stream 10 permeates through membrane sweeping unit 700 to the permeate side of membrane sweeping unit 700. Air feed 2 provides a continuous stream of air to sweep the permeate side of membrane sweeping unit 700.

Air feed 2 is any source of air, oxygen, or oxygen enriched air. In at least one embodiment of the present invention, an oxygen enrichment membrane system (not show) can be utilized to create oxygen enriched air from a raw air stream, where oxygen enrichment membrane system uses an oxygen selective membrane to separate oxygen from an air stream. The oxygen enrichment membrane system can be any system of membranes capable of extracting oxygen from an air stream to provide enriched air or a pure oxygen stream. The oxygen enrichment membrane system can be those known to one of skill in the art. The oxygen enriched air can be used as air feed 2 to sweep membrane sweeping unit 700. Alternately, the oxygen enriched air can be used as a direct feed to Claus process 100 or thermal oxidizer 200, or both. Oxygen enrichment of the combustion air to the reaction furnace of Claus process 100 improves (increases) capacity and improves the ability to handle contaminants. Without being bound to a particular theory, it is believed that the capacity of the reaction furnace is increased with oxygen enrichment due to the need for less gas flow (the more oxygen in the stream, the lower the overall flow needed) into the Claus furnace. Expanding capacity with oxygen enrichment can be used for handling extra acid gas loading at significantly reduced capital expense. Increased oxygen content in the reaction furnace of Claus process 100 increases flame temperature, which helps destroy contaminants and increase sulfur recovery. An oxygen selective membrane system is advantageous over other types of oxygen recovery units because it does not require significant operating costs due to high energy demands.

The $SO_2$ that reaches the permeate side of membrane sweeping unit 700 is collected and exits membrane sweeping unit 700 as sulfur dioxide enriched air stream 5. Sulfur dioxide enriched air stream 5 is fed to the thermal reaction stage of Claus process 100. Sulfur dioxide enriched air stream can include sulfur dioxide and air. Oxygen is a component of air. Sulfur dioxide is a reactant in the Claus reaction to recover elemental sulfur.

In at least one embodiment, sulfur dioxide enriched air stream 5 can increase the flame temperature within the reaction furnace of the thermal stage of Claus process 100. In at least one embodiment, sulfur dioxide enriched air stream 5 can decrease the flame temperature within the reaction furnace of the thermal stage of Claus process 100. The decrease in flame temperature can be between about 65° C. and about 10° C., alternately between about 60° C. and about 10° C., alternately between about 50° C. and about 10° C., alternately between about 40° C. and about 10° C., alternately between about 30° C. and about 10° C., and alternately between about 20° C. and about 10° C. In at least one embodiment, sulfur dioxide enriched air stream 5 has a minimal impact (less than 10 degrees) on the flame temperature within the reaction furnace of the thermal stage of Claus process 100. In at least one embodiment, sulfur dioxide enriched air stream 5 can be preheated in a heating unit (not shown) to maintain or increase the temperature in the reaction furnace. The impact on flame temperature is due to overall mass flow rate, overall composition of the feed to the reaction furnace. The overall composition of the feed is influenced by the amount of sulfur recovered and the amount of sulfur dioxide recycled to the reaction furnace.

The remaining gases from flue gas stream 10 form the retentate and exit membrane sweeping unit 700 as sulfur dioxide depleted stream 17. Sulfur dioxide depleted stream 17 contains less than 1 vol % sulfur dioxide, alternately less than 0.5 vol % sulfur dioxide, alternately less than 0.1 vol % sulfur dioxide, alternately less than 0.05 vol % sulfur dioxide, and alternately less than 0.01 vol % sulfur dioxide. Sulfur dioxide depleted stream 17 is introduced to incinerator stack 300. In at least one embodiment of the present invention, the method of the present invention is in the absence of recycling sulfur dioxide depleted stream 17 to the membrane sweeping unit, such as, for example mixing sulfur dioxide depleted stream 17 with flue gas stream 10. Without being bound to a particular theory, it is understood that recycling sulfur dioxide depleted stream 17 will reduce the $SO_2$ concentration, and as a result the partial pressure of sulfur dioxide. Reducing the $SO_2$ concentration reduces emissions from a Claus Unit, which are linked to $SO_2$ concentration and flow.

Incinerator stack 300 can be any type of incinerator stack capable of heating the remaining gases in sulfur dioxide depleted stream 17 for dissemination in the atmosphere as stack vent stream 19. All species in sulfur dioxide depleted stream 17 are oxidized to their final oxidation state in incinerator stack 300.

The overall sulfur recovery can be greater than 99.0%, alternately greater than 99.2%, alternately greater than 99.4%, alternately greater than 99.6%, and alternately greater than 99.8%.

With the use of instrumentation, the entire system can be monitored to minimize the $SO_2$ being discharged in stack vent stream 19. Instrumentation can be used to measure the $SO_2$ in sulfur dioxide enriched air stream 5 and air demand in Claus process 100 to adjust the flow rate of air feed 2. Instrumentation can be used to adjust the flows of the streams based on the amount of $SO_2$ in stack vent stream 19.

In one instance, a tail gas analyzer can be used to measure $SO_2$ in any of the process streams associated with FIG. 1.

Figure 2:
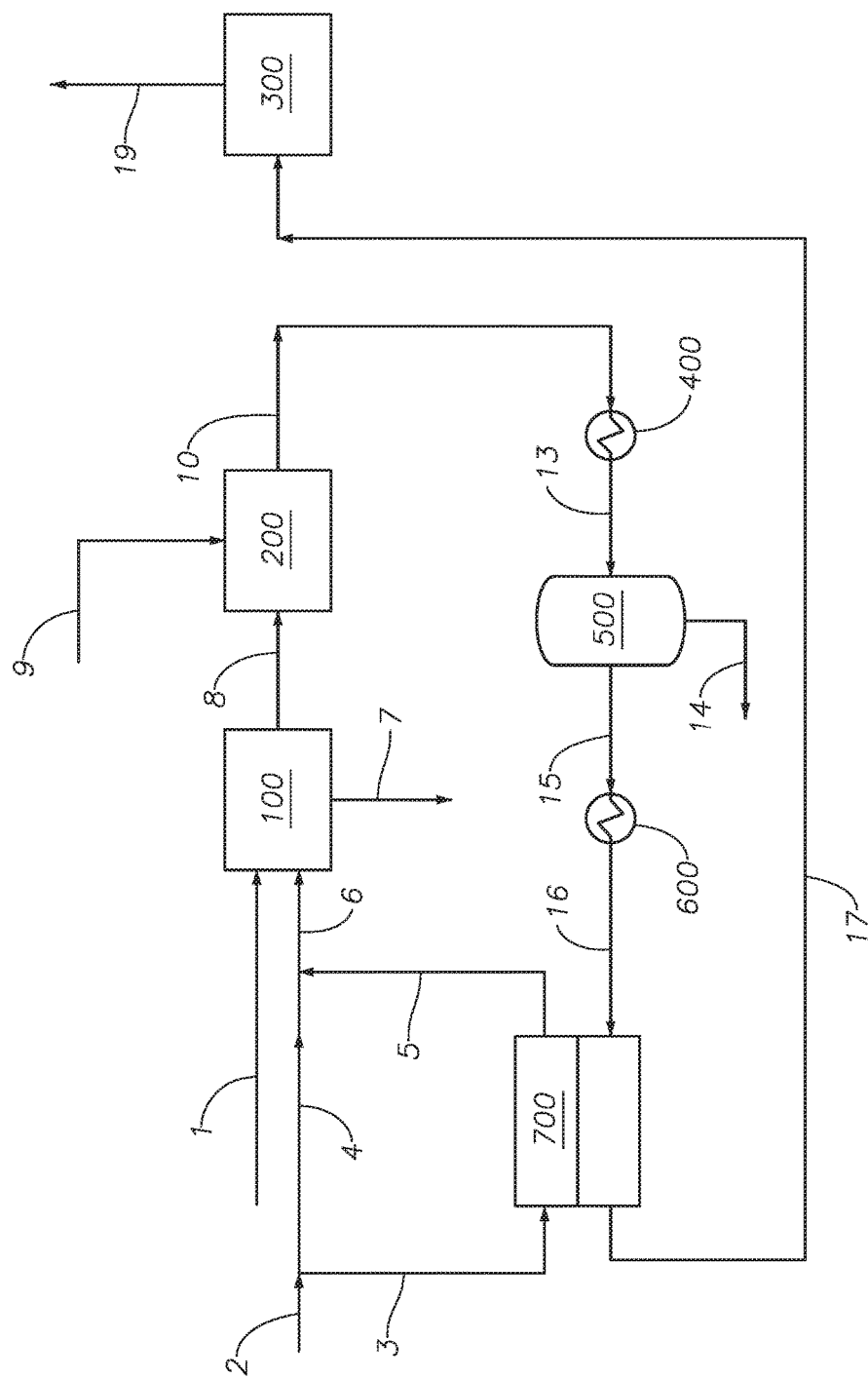
FIG. 2 is a process flow diagram of the process of the invention.

Referring to FIG. 2, an embodiment of the invention is described with reference to FIG. 1. Flue gas stream 10 is fed to cooler 400.

Cooler 400 lowers the temperature of flue gas stream 10 to a temperature below the dew point of water to produce cooled take-off stream 13. Cooler 400 can be any type of heat exchanger capable of cooling a gas stream. In at least one embodiment of the present invention, cooler 400 is a quench tower. Cooled take-off stream 13 is at a temperature at or just below the dew point of water, such that any water vapor present in flue gas stream 10 is condensable.

Liquid-gas separation unit 500 is any type of separation unit capable of separating the vapor from the liquid in cooled take-off stream 13 to produce condensed water 14 and saturated gas stream 15. In at least one embodiment, liquid-gas separation unit 500 is a knock out drum. Condensed water 14 contains the water condensed from cooled take-off stream 13. Condensed water 14 can be sent to be further processed or collected for storage. Saturated gas stream 15 contains those gases from flue gas stream 10 that were not condensed in liquid-gas separation unit 500. Saturated gas stream 15 is introduced to heater 600 to produce membrane gas stream 16.

Heater 600 heats saturated gas stream 15 above the dew point of the gases present in saturated gas stream 15 to ensure no liquids are present in membrane gas stream 16. Heater 600 can be any type of heat exchanger capable of heating a gas stream. Membrane gas stream 16 is fed to membrane sweeping unit 700. Sulfur dioxide present in membrane gas stream 16 permeates through membrane sweeping unit 700 and is collected in sweep air stream 3 to produce sulfur dioxide enriched air stream 5. Sweep air stream 3 drives the sulfur dioxide from membrane gas stream 16 across the membrane of membrane sweeping unit 700. In at least one embodiment, sweep air stream 3 enhances the separation and collection of the sulfur dioxide that permeates through the membrane of membrane sweeping unit 700.

Air feed 2 is split into sweep air stream 3 and air bypass stream 4. The flow rate of air bypass stream 4 can be determined based on the composition of acid gas feed 1, the membrane characteristics of membrane sweeping unit 700, the flue gas composition, the target rate for $SO_2$ in stack vent stream 19, the mandated rate of emissions of $SO_2$ in stack vent stream 19, or combinations of the same. Sulfur dioxide enriched air stream 5 is combined with air bypass stream 4 to produce combined air feed 6. Combined air feed 6 is fed to Claus process 100 along with acid gas feed 1.

The retentate of membrane sweeping unit 700 can be depleted of sulfur dioxide and forms sulfur dioxide depleted stream 17. Sulfur dioxide depleted stream 17 is fed to incinerator stack 300. Incinerator stack 300 burns the components present in sulfur dioxide depleted stream 17 before releasing them into the atmosphere as stack vent stream 19.

Figure 3:
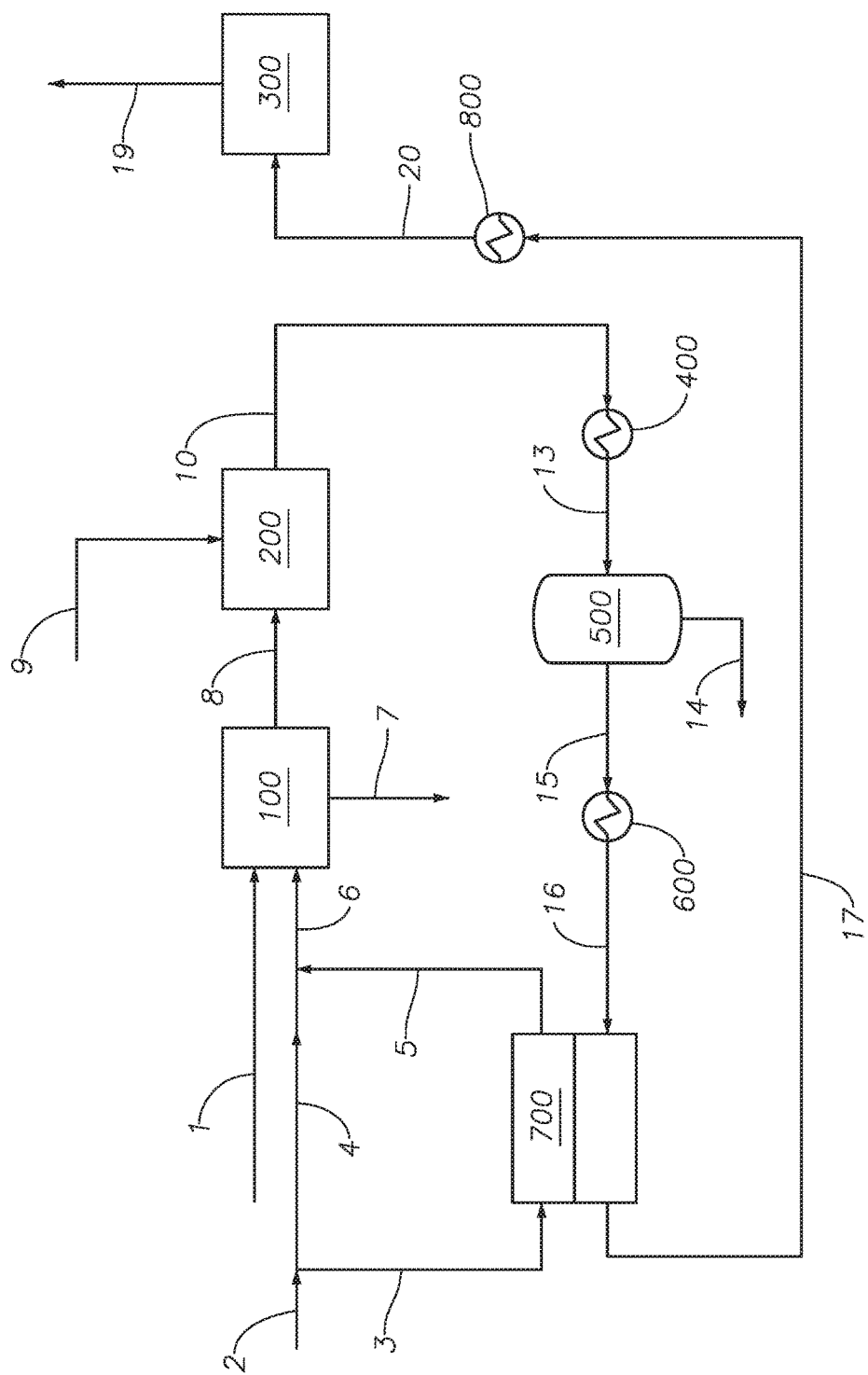
FIG. 3 is a process flow diagram of the process of the invention.

Referring to FIG. 3, a method of the invention is provided. In embodiments where the temperature of the feed to incinerator stack 300 needs to be increased to meet or exceed dispersion requirements, sulfur dioxide depleted stream 17 can be fed to reheater 800 to produce heated stack feed 20. Dispersion requirements refers to the need for the gas exciting incinerator stack 300 to be hot to ensure good sulfur dioxide dispersion from the tip of the stack. Reheater 800 can be any heat exchanger capable of increasing the temperature of sulfur dioxide depleted stream 17. Heated stack feed 20 has a stack temperature. In at least one embodiment, the stack temperature is 480° C. Heated stack feed 20 is fed to incinerator stack 300.

Figure 4:
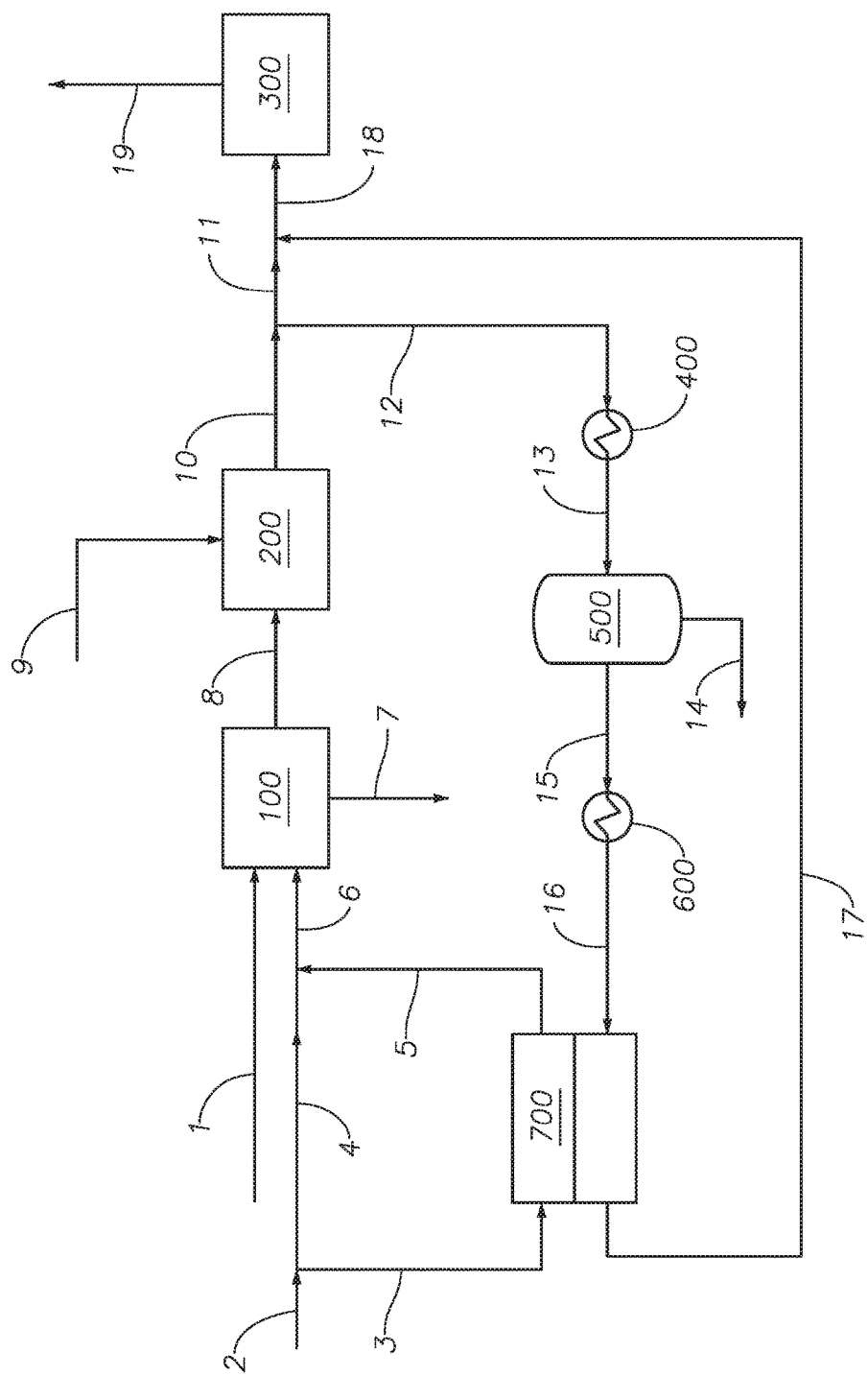
FIG. 4 is a process flow diagram of the process of the invention.

Referring to FIG. 4, a method of the invention is provided that includes a bypass stream to bypass the membrane and is described with reference to FIG. 1 and FIG. 2. Flue gas stream 10 can be split into membrane bypass stream 11 and effluent take-off stream 12. The flow rate of membrane bypass stream 11 can be determined based on the composition of acid gas feed 1, the membrane characteristics of membrane sweeping unit 700, the flue gas composition, the target rate for $SO_2$ in stack vent stream 19, the mandated rate of emissions of $SO_2$ in stack vent stream 19, or combinations of the same. In certain embodiments, effluent take-off stream 12 includes the entire volumetric flow rate from flue gas stream 10. Effluent take-off stream 12 is introduced to cooler 400. In certain embodiments of the invention, sulfur dioxide depleted stream 17 can be combined with membrane bypass stream 11 to form stack feed stream 18. Stack feed stream 18 is fed to incinerator stack 300. In at least one embodiment, membrane bypass stream 11 is used when cleaning or maintenance is being performed on membrane sweeping unit 700 and the flow rate of sulfur dioxide depleted stream 17 is zero and membrane bypass stream 11 becomes stack feed stream 18. In at least one embodiment, membrane bypass stream 11 is used when the concentration of sulfur dioxide in flue gas stream 10 is below a threshold, such that only a partial stream from flue gas stream 10 is sent to membrane sweeping unit 700 and is adequate to maintain overall system sulfur dioxide emissions below regulated levels.

Membrane sweeping unit 700 is in the absence of adsorbent. Without having adsorbent to replace, membrane sweeping unit 700 has lower operating costs. Advantageously, the absence of adsorbent eliminates the need to shut down the entire process as each membrane module runs on a bypass, which can be purged and that membrane replaced without having to take any of the other modules offline. Membrane sweeping unit 700 is in the absence of solvent. Without having solvent, there is not solvent to replace, without having a solvent to replace, membrane sweeping unit 700 has lower operating costs. Membrane sweeping unit 700 is in the absence of catalyst.

Advantageously, the use of membranes in the process of the invention reduces or eliminates the need for rotating equipment, including for rotating equipment used in gas compression. The membranes do not require rotating equipment for their operation, beyond what is being used in other parts of the process, such as compression of the air used in the air sweep. In addition, as the driving force of the membrane is provided by the air sweep, the gas in the membrane gas feed does not need to be compressed. The use of membranes lowers waste gas content by increasing the overall sulfur recovery efficiency over systems that are in the absence of membranes. The permeate side of the membrane is in the absence of vacuum suction or low pressure conditions. The membrane gas feed is in the absence of a compression step, such as in a compressor. In at least one embodiment, the membrane sweeping unit is in the absence of a recycle around the membrane sweeping unit, that is where a portion of the permeate is recycled to the feed side of the membrane.

EXAMPLES

Throughout the examples, references will be made to types of membranes for use in the various separation units. Table 1 includes a list of selected properties for exemplary membranes useful in the separation units of the present invention. The data in Table 1 was collected from independently developed data.

TABLE 1

Properties of exemplary membranes

| | Properties | | Membrane Properties | | | | | | | | |
|---|---|---|---|---|---|---|---|---|---|---|---|
| | | | Pebax® 1657 | | PEI/Pebax® 1657 | | Polyvinylidene fluoride (w/18 wt. % sulfone) | | Cellulose Acetate impregnated with TEG-DME | | PEI/Pebax® 3353 (HFM) |
| Gas Components | NBP, °C. [1] | Kinetic Diameter, Å [1] | $\alpha_i/co_2$ | GPU | $\alpha_i/co_2$ | GPU | $\alpha_i/co_2$ | GPU | $\alpha_i/co_2$ | GPU | $\alpha_i/co_2$ | GPU |
| $H_2S$ | −60 | 3.6 | $1.42^b$ | 141.57 | $0.93^e$ | 93.5 | | | | | | |
| $CO_2$ | −78 | 3.3 | 1 | $100.00^a$ | 1 | $100.00^a$ | 1 | $100.00^a$ | 1 | $100.00^a$ | 1 | $100.00^a$ |
| $H_2O$ | 100 | 2.65 | | | | | $146.4^d$ | 14640 | | | | |
| $O_2$ | −183 | 3.46 | $0.03^c$ | 3.19 | | | | | | | | |
| $N_2$ | −196 | 3.64 | $0.01^b$ | | $0.02^b$ | 1.76 | $0.05^f$ | 4.65 | $0.03^g$ | 3.05 | $0.02^h$ | 1.64 |
| $SO_2$ | 157.65 | 3.60 | $336.81^b$ | 33680.9 | $264.23^e$ | 26422.76 | $215^f$ | 21500 | $95.24^g$ | 9523.81 | $66.3^h$ | 6630 |
| Ar | −186 | 3.40 | | | | | | | | | | |

| | Properties | | Membrane Properties | | | | | | | | |
|---|---|---|---|---|---|---|---|---|---|---|---|
| | | | Cellulose Thacetate | | Ionic Liquid [emim] [BF4] supported on polyethersulfone | | Ionic Liquid [$N_{222}$] [dimalonate] supported on polyethersulfone | | Polyacrylate-35 | | High Flux Polycarbonate |
| Gas Components | NBP, °C. [1] | Kinetic Diameter, Å [1] | $\alpha_i/co_2$ | GPU | $\alpha_i/co_2$ | GPU | $\alpha_i/co_2$ | GPU | $\alpha_i/co_2$ | GPU | $\alpha_i/co_2$ | GPU |
| $H_2S$ | −60 | 3.6 | $0.86^d$ | 86.00 | | | | | | | | |
| $CO_2$ | −78 | 3.3 | 1 | $100.00^a$ | 1 | $100.00^a$ | 1 | $100.00^a$ | 1 | $100.00^a$ | 1 | $440^r$ |
| $H_2O$ | 100 | 2.65 | $238.7^j$ | 23870.00 | | | | | | | | |
| $O_2$ | −183 | 3.46 | $0.16^j$ | 16 | | | | | | | 0.19 | $82r$ |
| $N_2$ | −196 | 3.64 | $0.04^f$ | 3.57 | $0.09^m$ | 8.74 | $0.03^m$ | 3.00 | $0.043^n$ | 4.3 | 0.03 | $12^r$ |
| $SO_2$ | 157.65 | 3.60 | $48.21^f$ | 4821.43 | $19.48^m$ | 1947.92 | $18.00^m$ | 1800.00 | $20.40^n$ | 2040.05 | 0.91 | $400^r$ |
| Ar | −186 | 3.40 | 0.25 | 250 | | | | | | | | |

1 GPU = $10^{-6}$ cm$^3$ (STP)/cm$^2$.s.cmHg, or 3.35 × $10^{-10}$ mol/m$^2$.s.Pa in SI unit. Permeance (Pressure Normalized flux) Unit $\alpha_i/co_2$: Selectivity of the i-component to $CO_2$ The Examples were based on the configuration embodied in FIG. 2 and described herein. The Examples illustrate the contribution of the membrane, the air feed, and the acid gas feed to the sulfur dioxide enriched air stream and to sulfur recovery. The variations between Examples were the membrane material, the membrane area and the composition of the acid gas feed. The membrane area was determined based on the membrane characteristics, the acid gas feed composition, and the temperature and the flow rate of membrane gas stream 16. The membrane simulated design was calculated to provide the highest feasible recovery for a fixed flowrate of air feed 2. The operating conditions for acid gas feed 1 were the same for all examples. Acid gas feed 1 was at 41.85° C. (315 K) and 28.117 psia.

The examples that follow include one of five feed streams characterized in the following table. Feed streams A-D are the feed concentrations of Claus process with no Tail Gas Treatment Unit. Feed stream E assumes a Claus process with a Tail Gas Treatment Unit.

TABLE 2

Feed Stream Compositions

| | $H_2S$ (dry basis) | $CO_2$ (dry basis) |
|---|---|---|
| Feed Stream A | 100% | |
| Feed Stream B | 80% | 20% |
| Feed Stream C | 40% | 60% |
| Feed Stream D | 25% | 75% |
| Feed Stream E | 45% | 55% |

Example 1

Example 1 was simulated based on the configuration embodied in FIG. 2 and described above. Membrane sweeping unit 700 was modeled as a Pebax® 1657 type membrane with the properties as shown in Table 1 and a membrane area of 12522 m$^2$. Acid gas feed 1 was modeled with the composition of feed stream B in Table 2. The resulting concentrations of components % vol for selected streams are shown in Table 3.

TABLE 3

Stream Conditions and Flowrates for Example 1.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 126.8 | 213.0 | 482.2 | 25 | 25.0 | 25.0 |
| Pressure (psia) | 28.117 | 29.40 | 29.4 | 29.4 | 23.76 | 23.766 | 28.9 | 28.9 | 28.9 | 28.9 |
| Flow Rate (Kg-mol/hr) | 3581.7 | 6664.3 | 6495.7 | 6562.8 | 2736.4 | 8786.6 | 9135.6 | 6206.0 | 6139.0 | 6139.0 |

TABLE 3-continued

Stream Conditions and Flowrates for Example 1.

|        | Stream 1 | Stream 2 | Stream 3 | Stream 5 | Stream 7 | Stream 8 | Stream 10 | Stream 16 | Stream 17 | Stream 18 |
|--------|----------|----------|----------|----------|----------|----------|-----------|-----------|-----------|-----------|
| $H_2S$ | 0.770 | 0.000 | 0.000 | 0.000 | 0.000 | 0.004 | 0.000 | 0.000 | 0.000 | 0.000 |
| $CO_2$ | 0.190 | 0.000 | 0.000 | 0.005 | 0.000 | 0.081 | 0.078 | 0.115 | 0.111 | 0.111 |
| $H_2O$ | 0.040 | 0.013 | 0.013 | 0.013 | 0.000 | 0.336 | 0.328 | 0.010 | 0.010 | 0.010 |
| $O_2$  | 0.000 | 0.207 | 0.207 | 0.205 | 0.000 | 0.000 | 0.002 | 0.003 | 0.003 | 0.003 |
| $N_2$  | 0.000 | 0.771 | 0.771 | 0.763 | 0.000 | 0.570 | 0.579 | 0.852 | 0.862 | 0.862 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.006 | 0.000 | 0.002 | 0.006 | 0.009 | 0.004 | 0.004 |
| Ar     | 0.000 | 0.009 | 0.009 | 0.009 | 0.000 | 0.007 | 0.007 | 0.010 | 0.010 | 0.010 |

Table 4 is a comparison of a process as shown in FIG. 3 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 1. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 4

Comparison of systems

|   | Without membrane | With membrane | Delta |
|---|---|---|---|
| Process Recovery, % | 97.88 | 99.20 | 1.32 |
| Produced Sulfur, long tons/day | 2045.09 | 2072.63 | 27.54 |

Example 2

Example 2 was simulated based on the configuration embodied in FIG. 3 and described above. Membrane sweeping unit 700 was modeled as a Pebax® 1657 type membrane with the properties as shown in Table 1 and a membrane area of 11126 m². Acid gas feed 1 was modeled with the composition of feed stream C in Table 2. The resulting concentrations of components % vol for selected streams are shown in Table 5.

Table 6 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 2. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 6

Comparison of systems

|   | Without membrane | With membrane | Delta |
|---|---|---|---|
| Process Recovery, % | 97.91 | 98.91 | 1 |
| Produced Sulfur, long tons/day | 1022.90 | 1033.37 | 10.47 |

Example 3

Example 3 was simulated based on the configuration embodied in FIG. 2 and described above. Membrane sweeping unit 700 was modeled as a Pebax® 1657 type membrane with the properties as shown in Table 1 and a membrane area of 2855 m². Acid gas feed 1 was modeled with the composition of feed stream E in Table 2. The Tail Gas Treatment unit (part of Claus Process 100) reaches 99.24% recovery. The resulting concentrations of components % vol for selected streams are shown in Table 7.

TABLE 5

Stream Conditions and Flowrates for Example 2.

|        | Stream 1 | Stream 2 | Stream 3 | Stream 5 | Stream 7 | Stream 8 | Stream 10 | Stream 16 | Stream 17 | Stream 18 |
|--------|----------|----------|----------|----------|----------|----------|-----------|-----------|-----------|-----------|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 197.6 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 3334.3 | 3269.1 | 3384.1 | 1364.3 | 6286.3 | 6477.7 | 4966.7 | 4851.6 | 4851.6 |
| $H_2S$ | 0.385 | 0.000 | 0.000 | 0.000 | 0.000 | 0.003 | 0.000 | 0.000 | 0.000 | 0.000 |
| $CO_2$ | 0.577 | 0.000 | 0.000 | 0.030 | 0.000 | 0.345 | 0.335 | 0.437 | 0.426 | 0.426 |
| $H_2O$ | 0.038 | 0.013 | 0.013 | 0.013 | 0.000 | 0.245 | 0.241 | 0.010 | 0.010 | 0.010 |
| $O_2$  | 0.000 | 0.207 | 0.207 | 0.200 | 0.000 | 0.000 | 0.002 | 0.003 | 0.003 | 0.003 |
| $N_2$  | 0.000 | 0.771 | 0.771 | 0.744 | 0.000 | 0.401 | 0.413 | 0.538 | 0.551 | 0.551 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.004 | 0.000 | 0.001 | 0.004 | 0.006 | 0.003 | 0.003 |
| Ar     | 0.000 | 0.009 | 0.009 | 0.009 | 0.000 | 0.005 | 0.005 | 0.006 | 0.007 | 0.007 |

TABLE 7

Stream Conditions and Flowrates for Example 3.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 200 | 482.2 | 25 | 25 | 25 |
| Pressure (psia) | 28.11 | 29.4 | 29.4 | 29.4 | 22.67 | 22.67 | 28.9 | 28.9 | 28.9 | 28.9 |
| Flow Rate (Kg-mol/hr) | 2680.8 | 2798.0 | 2777.8 | 2806.6 | 1152.3 | 4912.2 | 4999.5 | 3740.5 | 3711.9 | 3711.9 |
| $H_2S$ | 0.431 | 0.000 | 0.000 | 0.000 | 0.000 | 0.001 | 0.000 | 0.000 | 0.000 | 0.000 |
| $CO_2$ | 0.530 | 0.000 | 0.000 | 0.009 | 0.000 | 0.295 | 0.290 | 0.387 | 0.383 | 0.383 |
| $H_2O$ | 0.038 | 0.013 | 0.013 | 0.013 | 0.000 | 0.263 | 0.259 | 0.010 | 0.010 | 0.010 |
| $O_2$ | 0.000 | 0.207 | 0.207 | 0.205 | 0.000 | 0.000 | 0.002 | 0.003 | 0.003 | 0.003 |
| $N_2$ | 0.000 | 0.771 | 0.771 | 0.763 | 0.000 | 0.436 | 0.442 | 0.591 | 0.595 | 0.595 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.002 | 0.000 | 0.001 | 0.002 | 0.002 | 0.001 | 0.001 |
| Ar | 0.000 | 0.009 | 0.009 | 0.009 | 0.000 | 0.005 | 0.005 | 0.007 | 0.007 | 0.007 |

Table 8 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 3. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 8

Comparison of systems

| | Without membrane | With membrane | Delta |
|---|---|---|---|
| Process Recovery, % | 99.24 | 99.60 | 0.36 |
| Produced Sulfur, long tons/day | 869.64 | 872.82 | 3.18 |

Example 4

Example 4 was simulated based on the configuration embodied in FIG. 3 and described above. Membrane sweeping unit 700 was modeled as a Pebax® 1657 type membrane with the properties as shown in Table 1 and a membrane area of 3960 m². Acid gas feed 1 was modeled with the composition of feed stream D in Table 2. The resulting concentrations of components % vol for selected streams are shown in Table 9.

TABLE 9

Stream Conditions and Flowrates for Example 4.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 186.3 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 3334.3 | 2057.2 | 2114.7 | 851.9 | 5270.9 | 5403.1 | 4419.2 | 4361.6 | 4361.6 |
| $H_2S$ | 0.241 | 0.000 | 0.000 | 0.000 | 0.000 | 0.002 | 0.000 | 0.000 | 0.000 | 0.000 |
| $CO_2$ | 0.721 | 0.000 | 0.000 | 0.025 | 0.000 | 0.500 | 0.488 | 0.596 | 0.592 | 0.592 |
| $H_2O$ | 0.038 | 0.013 | 0.013 | 0.013 | 0.000 | 0.193 | 0.190 | 0.010 | 0.010 | 0.010 |
| $O_2$ | 0.000 | 0.207 | 0.207 | 0.201 | 0.000 | 0.000 | 0.002 | 0.002 | 0.002 | 0.002 |
| $N_2$ | 0.000 | 0.771 | 0.771 | 0.750 | 0.000 | 0.301 | 0.313 | 0.383 | 0.388 | 0.388 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.003 | 0.000 | 0.001 | 0.003 | 0.004 | 0.003 | 0.003 |
| Ar | 0.000 | 0.009 | 0.009 | 0.009 | 0.000 | 0.004 | 0.004 | 0.005 | 0.005 | 0.005 |

Table 10 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 4. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 10

| Comparison of systems | | | |
|---|---|---|---|
| | Without membrane | With membrane | Delta |
| Process Recovery, % | 97.94 | 98.68 | 0.74 |
| Produced Sulfur, long tons/day | 640.44 | 645.30 | 4.86 |

Example 5

Example 5 was simulated based on the configuration embodied in FIG. 3 and described above. Membrane sweeping unit 700 was modeled as a cellulose acetate impregnated with TEG-DME (Liquid Membrane TEG-DME supported in Cellulose Acetate) type membrane with the properties as shown in Table 1 and a membrane area of 13950 m². Acid gas feed 1 was modeled with the composition of feed stream B in Table 2. The resulting concentrations of components % vol for selected streams are shown in Table 11.

TABLE 11

Stream Conditions and Flowrates for Example 5.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 204.9 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 6664.3 | 6509.7 | 6576.8 | 2734.2 | 8799.8 | 9146.7 | 6217.1 | 6150.0 | 6150.0 |
| $H_2S$ | 0.770 | 0.000 | 0.000 | 0.000 | 0.000 | 0.004 | 0.000 | 0.000 | 0.000 | 0.000 |
| $CO_2$ | 0.190 | 0.000 | 0.000 | 0.005 | 0.000 | 0.081 | 0.078 | 0.115 | 0.111 | 0.111 |
| $H_2O$ | 0.040 | 0.013 | 0.013 | 0.013 | 0.000 | 0.335 | 0.327 | 0.010 | 0.010 | 0.010 |
| $O_2$ | 0.000 | 0.207 | 0.207 | 0.205 | 0.000 | 0.000 | 0.002 | 0.003 | 0.003 | 0.003 |
| $N_2$ | 0.000 | 0.771 | 0.771 | 0.763 | 0.000 | 0.570 | 0.579 | 0.852 | 0.862 | 0.862 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.005 | 0.000 | 0.002 | 0.006 | 0.009 | 0.004 | 0.004 |
| Ar | 0.000 | 0.009 | 0.009 | 0.009 | 0.000 | 0.007 | 0.007 | 0.010 | 0.010 | 0.010 |

Table 12 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 5. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 12

| Comparison of systems | | | |
|---|---|---|---|
| | Without membrane | With membrane | Delta |
| Process Recovery, % | 97.88 | 99.12 | 1.24 |

TABLE 12-continued

| Comparison of systems | | | |
|---|---|---|---|
| | Without membrane | With membrane | Delta |
| Produced Sulfur, long tons/day | 2045.09 | 2070.91 | 25.82 |

Example 6

Example 6 was simulated based on the configuration embodied in FIG. 3 and described above. Membrane sweeping unit 700 was modeled as a cellulose acetate impregnated with TEG-DME (Liquid Membrane TEG-DME supported in Cellulose Acetate) type membrane with the properties as shown in Table 1 and a membrane area of 11257 m². Acid gas feed 1 was modeled with the composition of feed stream C in Table 2. The resulting concentrations of components % vol for selected streams are shown in Table 13.

TABLE 13

Stream Conditions and Flowrates for Example 6.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.07 | 127 | 197.5 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 3334.3 | 3273.5 | 3388.0 | 1363.450 | 6290.2 | 6481.6 | 4970.6 | 4855.3 | 4855.3 |
| $H_2S$ | 0.385 | 0.000 | 0.000 | 0.000 | 0.000 | 0.003 | 0.000 | 0.000 | 0.000 | 0.000 |
| $CO_2$ | 0.577 | 0.000 | 0.000 | 0.030 | 0.000 | 0.345 | 0.335 | 0.436 | 0.426 | 0.426 |
| $H_2O$ | 0.038 | 0.013 | 0.013 | 0.013 | 0.000 | 0.245 | 0.241 | 0.010 | 0.010 | 0.010 |
| $O_2$ | 0.000 | 0.207 | 0.207 | 0.200 | 0.000 | 0.000 | 0.002 | 0.003 | 0.003 | 0.003 |
| $N_2$ | 0.000 | 0.771 | 0.771 | 0.744 | 0.000 | 0.401 | 0.413 | 0.539 | 0.551 | 0.551 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.004 | 0.000 | 0.001 | 0.004 | 0.006 | 0.003 | 0.003 |
| Ar | 0.000 | 0.009 | 0.009 | 0.009 | 0.000 | 0.005 | 0.005 | 0.006 | 0.007 | 0.007 |

Table 14 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 6. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

Example 7

Example 7 was simulated based on the configuration embodied in FIG. 3 and described above. Membrane sweeping unit 700 was modeled as a cellulose acetate impregnated with TEG-DME (Liquid Membrane TEG-DME supported in Cellulose Acetate) type membrane with the properties as shown in Table 1 and a membrane area of 2944 $m^2$. Acid gas feed 1 was modeled with the composition of feed stream E in Table 2. The Tail Gas Treatment unit (part of Claus process 100) reaches 99.24% recovery. The resulting concentrations of components % vol for selected streams are shown in Table 15.

TABLE 15

Stream Conditions and Flowrates for Example 7.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 200.4 | 482.2 | 25 | 25 | 25 |
| Pressure (psia) | 28.11 | 29.4 | 29.4 | 29.4 | 22.67 | 22.67 | 28.9 | 28.9 | 28.9 | 28.9 |
| Flow Rate (Kg-mol/hr) | 2680.8 | 2798.0 | 2781.2 | 2809.9 | 1151.6 | 4915.5 | 5002.8 | 3743.7 | 3715.1 | 3715.1 |
| $H_2S$ | 0.431 | 0.000 | 0.000 | 0.000 | 0.000 | 0.001 | 0.000 | 0.000 | 0.000 | 0.000 |
| $CO_2$ | 0.530 | 0.000 | 0.000 | 0.009 | 0.000 | 0.295 | 0.289 | 0.387 | 0.383 | 0.383 |
| $H_2O$ | 0.038 | 0.013 | 0.013 | 0.013 | 0.000 | 0.262 | 0.259 | 0.010 | 0.010 | 0.010 |
| $O_2$ | 0.000 | 0.207 | 0.207 | 0.205 | 0.000 | 0.000 | 0.002 | 0.003 | 0.003 | 0.003 |
| $N_2$ | 0.000 | 0.771 | 0.771 | 0.763 | 0.000 | 0.436 | 0.442 | 0.591 | 0.596 | 0.596 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.001 | 0.000 | 0.001 | 0.002 | 0.002 | 0.001 | 0.001 |
| Ar | 0.000 | 0.009 | 0.009 | 0.009 | 0.000 | 0.005 | 0.005 | 0.007 | 0.007 | 0.007 |

TABLE 14

Comparison of systems

| | Without membrane | With membrane | Delta |
|---|---|---|---|
| Process Recovery, % | 97.92 | 98.85 | 0.93 |
| Produced Sulfur, long tons/day | 1022.90 | 1032.68 | 9.78 |

Table 16 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 7. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 16

Comparison of systems

| | Without membrane | With membrane | Delta |
|---|---|---|---|
| Process Recovery, % | 99.24 | 99.54 | 0.3 |
| Produced Sulfur, long tons/day | 869.64 | 872.29 | 2.65 |

Example 8

Example 8 was simulated based on the configuration embodied in FIG. 3 and described above. Membrane sweeping unit 700 was modeled as a cellulose acetate impregnated with TEG-DME (Liquid Membrane TEG-DME supported in Cellulose Acetate) type membrane with the properties as shown in Table 1 and a membrane area of 5218 $m^2$. Acid gas feed 1 was modeled with the composition of feed stream D in Table 2. The resulting concentrations of components % vol for selected streams are shown in Table 17.

TABLE 17

Stream Conditions and Flowrates for Example 8.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 179.5 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 2088.0 | 2059.8 | 2131.8 | 851.6 | 5287.9 | 5419.6 | 4435.8 | 4363.3 | 4363.3 |
| $H_2S$ | 0.241 | 0.000 | 0.000 | 0.000 | 0.000 | 0.002 | 0.000 | 0.000 | 0.000 | 0.000 |
| $CO_2$ | 0.721 | 0.000 | 0.000 | 0.031 | 0.000 | 0.501 | 0.489 | 0.597 | 0.592 | 0.592 |
| $H_2O$ | 0.038 | 0.013 | 0.013 | 0.013 | 0.000 | 0.192 | 0.190 | 0.010 | 0.010 | 0.010 |
| $O_2$ | 0.000 | 0.207 | 0.207 | 0.200 | 0.000 | 0.000 | 0.002 | 0.002 | 0.002 | 0.002 |
| $N_2$ | 0.000 | 0.771 | 0.771 | 0.744 | 0.000 | 0.300 | 0.312 | 0.382 | 0.388 | 0.388 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.003 | 0.000 | 0.001 | 0.003 | 0.004 | 0.003 | 0.003 |
| Ar | 0.000 | 0.009 | 0.009 | 0.009 | 0.000 | 0.004 | 0.004 | 0.005 | 0.005 | 0.005 |

Table 18 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 8. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 18

Comparison of systems

| | Without membrane | With membrane | Delta |
|---|---|---|---|
| Process Recovery, % | 97.94 | 98.63 | 0.69 |
| Produced Sulfur, long tons/day | 640.44 | 645.02 | 4.58 |

Example 9

Example 9 was simulated based on the configuration embodied in FIG. 3 and described above. Membrane sweeping unit 700 was modeled as a cellulose triacetate type membrane with the properties as shown in Table 1 and a membrane area of 89491 $m^2$. Acid gas feed 1 was modeled with the composition of feed stream B in Table 2. The resulting concentrations of components % vol for selected streams are shown in Table 19.

TABLE 19

Stream Conditions and Flowrates for Example 9.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 212.1 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 6664.3 | 6492.8 | 6722.2 | 2737.0 | 8945.9 | 9296.7 | 6368.8 | 6140.0 | 6140.0 |
| $H_2S$ | 0.770 | 0.000 | 0.000 | 0.000 | 0.000 | 0.004 | 0.000 | 0.000 | 0.000 | 0.000 |
| $CO_2$ | 0.190 | 0.000 | 0.000 | 0.029 | 0.000 | 0.098 | 0.094 | 0.137 | 0.111 | 0.111 |
| $H_2O$ | 0.040 | 0.013 | 0.013 | 0.013 | 0.000 | 0.330 | 0.322 | 0.010 | 0.010 | 0.010 |
| $O_2$ | 0.000 | 0.207 | 0.207 | 0.200 | 0.000 | 0.000 | 0.002 | 0.003 | 0.003 | 0.003 |
| $N_2$ | 0.000 | 0.771 | 0.771 | 0.744 | 0.000 | 0.559 | 0.569 | 0.831 | 0.861 | 0.861 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.005 | 0.000 | 0.002 | 0.006 | 0.009 | 0.004 | 0.004 |
| Ar | 0.000 | 0.009 | 0.009 | 0.009 | 0.000 | 0.007 | 0.007 | 0.010 | 0.010 | 0.010 |

Table 20 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 9. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 20

Comparison of systems

|  | Without membrane | With membrane | Delta |
|---|---|---|---|
| Process Recovery, % | 97.80 | 99.22 | 1.42 |
| Produced Sulfur, long tons/day | 2045.09 | 2073.07 | 27.98 |

Example 10

Example 10 was simulated based on the configuration embodied in FIG. 3 and described above. Membrane sweeping unit 700 was modeled as a cellulose triacetate type membrane with the properties as shown in Table 1 and a membrane area of 11404 m². Acid gas feed 1 was modeled with the composition of feed stream C in Table 2. The resulting concentrations of components % vol for selected streams are shown in Table 21.

not include a membrane (not shown). The table provides a comparison between the baseline state of the art (no membrane) and the improvement in sulfur recovery in a system of the present invention (membrane) according to the conditions and streams of Example 10. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 22

Comparison of systems

|  | Without membrane | With membrane | Delta |
|---|---|---|---|
| Process Recovery, % | 97.92 | 98.77 | 0.85 |
| Produced Sulfur, long tons/day | 1022.90 | 1031.92 | 9.02 |

Example 11

Example 11 was simulated based on the configuration embodied in FIG. 3 and described above. Membrane sweeping unit 700 was modeled as a cellulose triacetate type membrane with the properties as shown in Table 1 and a membrane area of 3026 m². Acid gas feed 1 was modeled with the composition of feed stream E in Table 2. The Tail Gas Treatment unit reaches 99.24% recovery. The resulting concentrations of components % vol for selected streams are shown in Table 23.

TABLE 21

Stream Conditions and Flowrates for Example 10.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.07 | 127 | 197.5 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 3334.3 | 3278.4 | 3392.9 | 1362.4 | 6295.1 | 6486.5 | 4975.5 | 4860.1 | 4860.1 |
| $H_2S$ | 0.385 | 0.000 | 0.000 | 0.000 | 0.000 | 0.003 | 0.000 | 0.000 | 0.000 | 0.000 |
| $CO_2$ | 0.577 | 0.000 | 0.000 | 0.030 | 0.000 | 0.345 | 0.335 | 0.436 | 0.425 | 0.425 |
| $H_2O$ | 0.038 | 0.013 | 0.013 | 0.013 | 0.000 | 0.245 | 0.241 | 0.010 | 0.010 | 0.010 |
| $O_2$ | 0.000 | 0.207 | 0.207 | 0.200 | 0.000 | 0.000 | 0.002 | 0.003 | 0.003 | 0.003 |
| $N_2$ | 0.000 | 0.771 | 0.771 | 0.745 | 0.000 | 0.401 | 0.413 | 0.539 | 0.552 | 0.552 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.003 | 0.000 | 0.001 | 0.004 | 0.006 | 0.003 | 0.003 |
| Ar | 0.000 | 0.009 | 0.009 | 0.009 | 0.000 | 0.005 | 0.005 | 0.006 | 0.007 | 0.007 |

Table 22 is a comparison of a process as shown in FIG. 2 with a membrane unit and air sweep and a process that does

TABLE 23

Stream Conditions and Flowrates for Example 11.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 200.3 | 482.2 | 25 | 25 | 25 |
| Pressure (psia) | 28.11 | 29.4 | 29.4 | 29.4 | 22.67 | 22.67 | 28.9 | 28.9 | 28.9 | 28.9 |

TABLE 23-continued

Stream Conditions and Flowrates for Example 11.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Flow Rate (Kg-mol/hr) | 2680.8 | 2798.0 | 2783.9 | 2812.6 | 1151.0 | 4918.2 | 5005.7 | 3746.7 | 3718.0 | 3718.0 |
| $H_2S$ | 0.431 | 0.000 | 0.000 | 0.000 | 0.000 | 0.001 | 0.000 | 0.000 | 0.000 | 0.000 |
| $CO_2$ | 0.530 | 0.000 | 0.000 | 0.009 | 0.000 | 0.295 | 0.289 | 0.387 | 0.383 | 0.383 |
| $H_2O$ | 0.038 | 0.013 | 0.013 | 0.013 | 0.000 | 0.262 | 0.259 | 0.010 | 0.010 | 0.010 |
| $O_2$ | 0.000 | 0.207 | 0.207 | 0.207 | 0.000 | 0.000 | 0.002 | 0.003 | 0.003 | 0.003 |
| $N_2$ | 0.000 | 0.771 | 0.771 | 0.763 | 0.000 | 0.436 | 0.443 | 0.591 | 0.596 | 0.596 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.001 | 0.000 | 0.001 | 0.002 | 0.002 | 0.002 | 0.002 |
| Ar | 0.000 | 0.009 | 0.009 | 0.009 | 0.000 | 0.005 | 0.005 | 0.007 | 0.007 | 0.007 |

Table 24 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 11. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 24

Comparison of systems

| | Without membrane | With membrane | Delta |
|---|---|---|---|
| Process Recovery, % | 99.24 | 99.49 | 0.25 |
| Produced Sulfur, long tons/day | 869.64 | 871.84 | 2.2 |

Example 12

Example 12 was simulated based on the configuration embodied in FIG. 3 and described above. Membrane sweeping unit 700 was modeled as a cellulose acetate impregnated with TEG-DME (Liquid Membrane TEG-DME supported in Cellulose Acetate) type membrane with the properties as shown in Table 1 and a membrane area of 5218 m². Acid gas feed 1 was modeled with the composition of feed stream D in Table 2. The resulting concentrations of components % vol for selected streams are shown in Table 25.

TABLE 25

Stream Conditions and Flowrates for Example 12.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 186.2 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 2088.0 | 2062.5 | 2134.9 | 850.8 | 5291.1 | 5423.4 | 4439.7 | 4367.1 | 4367.1 |
| $H_2S$ | 0.241 | 0.000 | 0.000 | 0.000 | 0.000 | 0.002 | 0.000 | 0.000 | 0.000 | 0.000 |
| $CO_2$ | 0.721 | 0.000 | 0.000 | 0.032 | 0.000 | 0.501 | 0.489 | 0.597 | 0.591 | 0.591 |
| $H_2O$ | 0.038 | 0.013 | 0.013 | 0.013 | 0.000 | 0.192 | 0.190 | 0.010 | 0.010 | 0.010 |
| $O_2$ | 0.000 | 0.207 | 0.207 | 0.200 | 0.000 | 0.000 | 0.002 | 0.002 | 0.002 | 0.002 |
| $N_2$ | 0.000 | 0.771 | 0.771 | 0.744 | 0.000 | 0.300 | 0.313 | 0.382 | 0.388 | 0.388 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.002 | 0.000 | 0.001 | 0.003 | 0.004 | 0.003 | 0.003 |
| Ar | 0.000 | 0.009 | 0.009 | 0.009 | 0.000 | 0.004 | 0.004 | 0.005 | 0.005 | 0.005 |

Table 26 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 12. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 26

Comparison of systems

| | Without membrane | With membrane | Delta |
|---|---|---|---|
| Process Recovery, % | 97.94 | 98.55 | 0.61 |
| Produced Sulfur, long tons/day | 640.44 | 644.46 | 4.02 |

Example 13

Example 13 was simulated based on the configuration embodied in FIG. 3 and described above. Membrane sweeping unit 700 was modeled as an ionic liquid [emin][BF4] supported on polyethersulfone-PES type membrane with the properties as shown in Table 1 and a membrane area of 35076.88 m². Acid gas feed 1 was modeled with the composition of feed stream B in table 2. The resulting concentrations of components % vol for selected streams are shown in Table 27.

TABLE 28

| Comparison of systems | | | |
|---|---|---|---|
| | Without membrane | With membrane | Delta |
| Process Recovery, % | 97.80 | 98.99 | 1.19 |
| Produced Sulfur, long tons/day | 2045.09 | 2068.21 | 28.12 |

TABLE 27

Stream Conditions and Flowrates for Example 13.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 293.3 | 127 | 482.2 | 25 | 25.026 | 25.026 |
| Pressure (psia) | 28.11 | 29.40 | 29.4 | 29.4 | 23.76 | 23.76 | 28.9 | 28.9 | 28.9 | 28.9 |
| Flow Rate (Kg-mol/hr) | 3581.7 | 6664.3 | 6522.3 | 6635.2 | 2730.6 | 8859.1 | 9210.4 | 6281.2 | 6168.4 | 6168.4 |
| $H_2S$ | 0.770 | 0.000 | 0.000 | 0.000 | 0.000 | 0.004 | 0.000 | 0.000 | 0.000 | 0.000 |
| $CO_2$ | 0.190 | 0.000 | 0.000 | 0.013 | 0.000 | 0.086 | 0.083 | 0.122 | 0.111 | 0.111 |
| $H_2O$ | 0.040 | 0.013 | 0.013 | 0.013 | 0.000 | 0.333 | 0.325 | 0.010 | 0.010 | 0.010 |
| $O_2$ | 0.000 | 0.207 | 0.207 | 0.203 | 0.000 | 0.000 | 0.002 | 0.003 | 0.003 | 0.003 |
| $N_2$ | 0.000 | 0.771 | 0.771 | 0.757 | 0.000 | 0.567 | 0.577 | 0.846 | 0.861 | 0.861 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.005 | 0.000 | 0.002 | 0.006 | 0.009 | 0.005 | 0.005 |
| Ar | 0.000 | 0.009 | 0.009 | 0.009 | 0.000 | 0.007 | 0.007 | 0.010 | 0.010 | 0.010 |

Table 28 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 13. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

Example 14

Example 14 was simulated based on the configuration embodied in FIG. 3 and described above. Membrane sweeping unit 700 was modeled as an ionic liquid [emin][BF4] supported on polyethersulfone-PES type membrane with the properties as shown in Table 1 and a membrane area of 11723 m². Acid gas feed 1 was modeled with the composition of feed stream C in Table 2. The resulting concentrations of components % vol for selected streams are shown in Table 29.

TABLE 29

Stream Conditions and Flowrates for Example 14.

| | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.069 | 127 | 197.4 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 3334.3 | 3288.2 | 3402.8 | 1360.2 | 6305.1 | 6497.2 | 4986.1 | 4870.4 | 4870.4 |
| $H_2S$ | 0.385 | 0.000 | 0.000 | 0.000 | 0.000 | 0.003 | 0.000 | 0.000 | 0.000 | 0.000 |
| $CO_2$ | 0.577 | 0.000 | 0.000 | 0.031 | 0.000 | 0.345 | 0.334 | 0.436 | 0.424 | 0.424 |
| $H_2O$ | 0.038 | 0.013 | 0.013 | 0.013 | 0.000 | 0.244 | 0.240 | 0.010 | 0.010 | 0.010 |
| $O_2$ | 0.000 | 0.207 | 0.207 | 0.200 | 0.000 | 0.000 | 0.002 | 0.003 | 0.003 | 0.003 |
| $N_2$ | 0.000 | 0.771 | 0.771 | 0.745 | 0.000 | 0.402 | 0.414 | 0.539 | 0.552 | 0.552 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.003 | 0.000 | 0.001 | 0.004 | 0.006 | 0.004 | 0.004 |
| Ar | 0.000 | 0.009 | 0.009 | 0.009 | 0.000 | 0.005 | 0.005 | 0.006 | 0.007 | 0.007 |

Table 30 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 14. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 30

Comparison of systems

|  | Without membrane | With membrane | Delta |
|---|---|---|---|
| Process Recovery, % | 97.92 | 98.62 | 0.70 |
| Produced Sulfur, long tons/day | 1022.90 | 1030.29 | 7.39 |

Example 15

Example 15 was simulated based on the configuration embodied in FIG. 3 and described above. Membrane sweeping unit 700 was modeled as an ionic liquid [emin][BF4] supported on polyethersulfone-PES type membrane with the properties as shown in Table 1 and a membrane area of 3152 m². Acid gas feed 1 was modeled with the composition of feed stream E in Table 2. The Tail Gas Treatment unit reaches 99.24% recovery. The resulting concentrations of components % vol for selected streams are shown in Table 31.

not include a membrane (not shown). The table provides a comparison between the baseline state of the art (no membrane) and the improvement in sulfur recovery in a system of the present invention (membrane) according to the conditions and streams of Example 15. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 32

Comparison of systems

|  | Without membrane | With membrane | Delta |
|---|---|---|---|
| Process Recovery, % | 99.24 | 99.41 | 0.17 |
| Produced Sulfur, long tons/day | 869.64 | 871.07 | 1.43 |

Example 16

Example 16 was simulated based on the configuration embodied in FIG. 3 and described above. Membrane sweeping unit 700 was modeled as an ionic liquid [emin][BF4] supported on polyethersulfone-PES type membrane with the properties as shown in Table 1 and a membrane area of 5405 m². Acid gas feed 1 was modeled with the composition of feed stream D in Table 2. The resulting concentrations of

TABLE 31

Stream Conditions and Flowrates for Example 15.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 200.3 | 482.2 | 25 | 25 | 25 |
| Pressure (psia) | 28.11 | 29.4 | 29.4 | 29.4 | 22.67 | 22.67 | 28.9 | 28.9 | 28.9 | 28.9 |
| Flow Rate (Kg-mol/hr) | 2680.8 | 2798.0 | 2789.1 | 2818.0 | 1150.0 | 4923.6 | 5010.9 | 3751.9 | 3723.2 | 3723.2 |
| $H_2S$ | 0.431 | 0.000 | 0.000 | 0.000 | 0.000 | 0.001 | 0.000 | 0.000 | 0.000 | 0.000 |
| $CO_2$ | 0.530 | 0.000 | 0.000 | 0.010 | 0.000 | 0.294 | 0.289 | 0.386 | 0.382 | 0.382 |
| $H_2O$ | 0.038 | 0.013 | 0.013 | 0.013 | 0.000 | 0.262 | 0.259 | 0.010 | 0.010 | 0.010 |
| $O_2$ | 0.000 | 0.207 | 0.207 | 0.205 | 0.000 | 0.000 | 0.002 | 0.003 | 0.003 | 0.003 |
| $N_2$ | 0.000 | 0.771 | 0.771 | 0.763 | 0.000 | 0.436 | 0.443 | 0.591 | 0.596 | 0.596 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.001 | 0.000 | 0.001 | 0.002 | 0.002 | 0.002 | 0.002 |
| Ar | 0.000 | 0.009 | 0.009 | 0.009 | 0.000 | 0.005 | 0.005 | 0.007 | 0.007 | 0.007 |

Table 32 is a comparison of a process as shown in FIG. 2 with a membrane unit and air sweep and a process that does components % vol for selected streams are shown in Table 33.

TABLE 33

Stream Conditions and Flowrates for Example 16.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 186.1 | 482.2 | 25 | 25 | 25 |

TABLE 33-continued

Stream Conditions and Flowrates for Example 16.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 2048.0 | 2068.1 | 2140.9 | 849.6 | 5297.2 | 5430.0 | 4446.2 | 4373.4 | 4373.4 |
| $H_2S$ | 0.241 | 0.000 | 0.000 | 0.000 | 0.000 | 0.002 | 0.000 | 0.000 | 0.000 | 0.000 |
| $CO_2$ | 0.721 | 0.000 | 0.000 | 0.032 | 0.000 | 0.501 | 0.488 | 0.596 | 0.591 | 0.591 |
| $H_2O$ | 0.038 | 0.013 | 0.013 | 0.013 | 0.000 | 0.192 | 0.189 | 0.010 | 0.010 | 0.010 |
| $O_2$ | 0.000 | 0.207 | 0.207 | 0.200 | 0.000 | 0.000 | 0.002 | 0.002 | 0.002 | 0.002 |
| $N_2$ | 0.000 | 0.771 | 0.771 | 0.744 | 0.000 | 0.301 | 0.313 | 0.383 | 0.389 | 0.389 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.002 | 0.000 | 0.001 | 0.003 | 0.004 | 0.003 | 0.003 |
| Ar | 0.000 | 0.009 | 0.009 | 0.009 | 0.000 | 0.004 | 0.004 | 0.005 | 0.005 | 0.005 |

Table 34 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 16. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 34

Comparison of systems

|  | Without membrane | With membrane | Delta |
|---|---|---|---|
| Process Recovery, % | 97.94 | 98.40 | 0.46 |
| Produced Sulfur, long tons/day | 640.44 | 643.52 | 3.08 |

Example 17

Example 17 was simulated based on the configuration embodied in FIG. 3 and described above. Membrane sweeping unit 700 was modeled as an ionic liquid [emin][BF4] supported on polyethersulfone-PES type membrane with the properties as shown in Table 1 and a membrane area of 99705 m². Acid gas feed 1 was modeled with the composition of feed stream A in Table 2. The resulting concentrations of components % vol for selected streams are shown in Table 35.

TABLE 35

Stream Conditions and Flowrates for Example 17.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 215.7 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 8660.8 | 8427.9 | 8663.8 | 3553.2 | 10482.9 | 10928.3 | 7302.2 | 7066.5 | 7066.5 |
| $H_2S$ | 1.000 | 0.000 | 0.000 | 0.000 | 0.000 | 0.005 | 0.000 | 0.000 | 0.000 | 0.000 |
| $CO_2$ | 0.000 | 0.000 | 0.000 | 0.000 | 0.000 | 0.000 | 0.000 | 0.000 | 0.000 | 0.000 |
| $H_2O$ | 0.000 | 0.013 | 0.013 | 0.013 | 0.000 | 0.348 | 0.339 | 0.010 | 0.010 | 0.010 |
| $O_2$ | 0.000 | 0.207 | 0.207 | 0.201 | 0.000 | 0.000 | 0.002 | 0.003 | 0.003 | 0.003 |
| $N_2$ | 0.000 | 0.771 | 0.771 | 0.771 | 0.000 | 0.637 | 0.645 | 0.965 | 0.971 | 0.971 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.006 | 0.000 | 0.002 | 0.007 | 0.010 | 0.004 | 0.004 |
| Ar | 0.000 | 0.009 | 0.009 | 0.009 | 0.000 | 0.007 | 0.007 | 0.011 | 0.012 | 0.012 |

Table 36 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 17. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 36

Comparison of systems

|  | Without membrane | With membrane | Delta |
|---|---|---|---|
| Process Recovery, % | 97.87 | 99.22 | 1.35 |
| Produced Sulfur, long tons/day | 2654.77 | 2691.24 | 36.47 |

Example 18

Example 18 was simulated based on the configuration embodied in FIG. 3 and described above. Membrane sweeping unit 700 was modeled as an ionic liquid $[N_{222}]$[dimalonate] supported on polyethersulfone-PES type membrane with the properties as shown in Table 1 and a membrane area of 103854 $m^2$. Acid gas feed 1 was modeled with the composition of feed stream A in Table 2. The resulting concentrations of components % vol for selected streams are shown in Table 37.

TABLE 37

Stream Conditions and Flowrates for Example 18.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 216.3 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 8660.8 | 8429.7 | 8546.1 | 3552.8 | 10365.2 | 10809.7 | 7182.5 | 7066.2 | 7066.2 |
| $H_2S$ | 1.000 | 0.000 | 0.000 | 0.000 | 0.000 | 0.005 | 0.000 | 0.000 | 0.000 | 0.000 |
| $CO_2$ | 0.000 | 0.000 | 0.000 | 0.000 | 0.000 | 0.000 | 0.000 | 0.000 | 0.000 | 0.000 |
| $H_2O$ | 0.000 | 0.013 | 0.013 | 0.013 | 0.000 | 0.352 | 0.342 | 0.010 | 0.010 | 0.010 |
| $O_2$ | 0.000 | 0.207 | 0.207 | 0.204 | 0.000 | 0.000 | 0.002 | 0.003 | 0.003 | 0.003 |
| $N_2$ | 0.000 | 0.771 | 0.771 | 0.768 | 0.000 | 0.633 | 0.641 | 0.964 | 0.971 | 0.971 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.006 | 0.000 | 0.002 | 0.007 | 0.011 | 0.004 | 0.004 |
| Ar | 0.000 | 0.009 | 0.009 | 0.009 | 0.000 | 0.007 | 0.008 | 0.011 | 0.012 | 0.012 |

Table 38 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 18. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 38

Comparison of systems

|  | Without membrane | With membrane | Delta |
|---|---|---|---|
| Process Recovery, % | 97.87 | 99.22 | 1.33 |
| Produced Sulfur, long tons/day | 2654.77 | 2690.91 | 36.14 |

Example 19

Example 19 was simulated based on the configuration embodied in FIG. 3 and described above. Membrane sweeping unit 700 was modeled as a polyacrylate-35 type membrane with the properties as shown in Table 1 and a membrane area of 95245.23 $m^2$. Acid gas feed 1 was modeled with the composition of feed stream A in Table 2. The resulting concentrations of components % vol for selected streams are shown in Table 39.

TABLE 39

Stream Conditions and Flowrates for Example 19.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 216.2 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 8660.8 | 8428.8 | 8565.2 | 3553.0 | 10384.4 | 10829.0 | 7201.9 | 7065.0 | 7065.0 |
| $H_2S$ | 1.000 | 0.000 | 0.000 | 0.000 | 0.000 | 0.005 | 0.000 | 0.000 | 0.000 | 0.000 |
| $CO_2$ | 0.000 | 0.000 | 0.000 | 0.000 | 0.000 | 0.000 | 0.000 | 0.000 | 0.000 | 0.000 |
| $H_2O$ | 0.000 | 0.013 | 0.013 | 0.013 | 0.000 | 0.351 | 0.342 | 0.010 | 0.010 | 0.010 |
| $O_2$ | 0.000 | 0.207 | 0.207 | 0.203 | 0.000 | 0.000 | 0.002 | 0.003 | 0.003 | 0.003 |
| $N_2$ | 0.000 | 0.771 | 0.771 | 0.768 | 0.000 | 0.634 | 0.641 | 0.965 | 0.971 | 0.971 |

TABLE 39-continued

Stream Conditions and Flowrates for Example 19.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.006 | 0.000 | 0.002 | 0.007 | 0.011 | 0.004 | 0.004 |
| Ar | 0.000 | 0.009 | 0.009 | 0.009 | 0.000 | 0.007 | 0.008 | 0.011 | 0.012 | 0.012 |

Table 40 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 19. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 40

Comparison of systems

|  | Without membrane | With membrane | Delta |
|---|---|---|---|
| Process Recovery, % | 97.87 | 99.21 | 1.34 |
| Produced Sulfur, long tons/day | 2654.77 | 2691.05 | 38.34 |

Example 20

Example 20 was simulated based on the configuration embodied in FIG. 3 and described above. Membrane sweeping unit 700 was modeled as a polycarbonate type membrane with the properties as shown in Table 1 and a membrane area of 77965 m$^2$. Acid gas feed 1 was modeled with the composition of feed stream A in Table 2. The resulting concentrations of components % vol for selected streams are shown in Table 40.

Table 42 is a comparison of a process as shown in FIG. 2 with a membrane unit and air sweep and a process that does not include a membrane (not shown). The table provides a comparison between the baseline state of the art (no membrane) and the improvement in sulfur recovery in a system of the present invention (membrane) according to the conditions and streams of Example 20. Process recovery percent (%) refers to the sulfur recovery of the system, that is the percent of sulfur recovered from the acid gas feed. The delta is a measure of the improvement in terms of additional sulfur recovered (produced sulfur in long tons/day) of the system with a membrane over a system without a membrane. Each 0.1% additional sulfur recovery can mean a significant reduction in sulfur emissions from the system.

TABLE 42

Comparison of systems

|  | Without membrane | With membrane | Delta |
|---|---|---|---|
| Process Recovery, % | 97.87 | 98.76 | 0.88 |
| Produced Sulfur, long tons/day | 2654.77 | 2678.86 | 24.09 |

TABLE 41

Stream Conditions and Flowrates for Example 20.

|  | Stream 1 | Stream 2 | Stream 3 | Stream 5 | Stream 7 | Stream 8 | Stream 10 | Stream 16 | Stream 17 | Stream 18 |
|---|---|---|---|---|---|---|---|---|---|---|
| Phase | Vapor | Vapor | Vapor | Vapor | Liquid | Vapor | Vapor | Vapor | Vapor | Vapor |
| Temp (° C.) | 41.8 | 25 | 25 | 25.0 | 127 | 215.5 | 482.2 | 25 | 25 | 25 |
| Pressure (psia) | 28.11 | 29.4 | 29.4 | 29.4 | 23.76 | 23.76 | 28.9 | 28.9 | 28.9 | 28.9 |
| Flow Rate (Kg-mol/hr) | 3581.7 | 8660.8 | 8488.7 | 8726.4 | 3536.9 | 10545.6 | 10993.0 | 7366.8 | 7129.3 | 7129.3 |
| $H_2S$ | 1.000 | 0.000 | 0.000 | 0.000 | 0.000 | 0.005 | 0.000 | 0.000 | 0.000 | 0.000 |
| $CO_2$ | 0.000 | 0.000 | 0.000 | 0.001 | 0.000 | 0.000 | 0.000 | 0.001 | 0.000 | 0.000 |
| $H_2O$ | 0.000 | 0.013 | 0.013 | 0.013 | 0.000 | 0.346 | 0.337 | 0.010 | 0.010 | 0.010 |
| $O_2$ | 0.000 | 0.207 | 0.207 | 0.201 | 0.000 | 0.000 | 0.002 | 0.003 | 0.003 | 0.003 |
| $N_2$ | 0.000 | 0.771 | 0.771 | 0.772 | 0.000 | 0.639 | 0.647 | 0.965 | 0.969 | 0.969 |
| Sulfur | 0.000 | 0.000 | 0.000 | 0.000 | 1.000 | 0.000 | 0.000 | 0.000 | 0.000 | 0.000 |
| $SO_2$ | 0.000 | 0.000 | 0.000 | 0.004 | 0.000 | 0.002 | 0.007 | 0.010 | 0.006 | 0.006 |
| Ar | 0.000 | 0.009 | 0.009 | 0.009 | 0.000 | 0.007 | 0.008 | 0.011 | 0.012 | 0.012 |

TABLE 43

Comparison of Furnace Temperatures in the Examples

| | Feed Composition (Table 2) | Membrane Material | Estimated Furnace Temp. (° C.) | Temp. Difference between no membrane system and system with membrane (° C.) |
|---|---|---|---|---|
| No Membrane | All Compositions | No Membrane | 1050.00 | 0 |
| Example 1 | B | PEBAX 1657 | 1007.41 | 42.59 |
| Example 2 | C | PEBAX 1657 | 1018.29 | 31.71 |
| Example 3 | E | PEBAX 1657 | 1040.04 | 9.96 |
| Example 4 | D | PEBAX 1657 | 1032.38 | 17.62 |
| Example 5 | B | Cellulose acetate with TEG-DME | 1010.14 | 39.86 |
| Example 6 | C | Cellulose acetate with TEG-DME | 1019.16 | 30.84 |
| Example 7 | E | Cellulose acetate with TEG-DME | 1041.29 | 8.71 |
| Example 8 | D | Cellulose acetate with TEG-DME | 1030.29 | 19.71 |
| Example 9 | B | Cellulose triacetate | 987.83 | 62.17 |
| Example 10 | C | Cellulose triacetate | 1020.15 | 29.85 |
| Example 11 | E | Cellulose triacetate | 1042.30 | 7.7 |
| Example 12 | D | Cellulose triacetate | 1031.01 | 18.99 |
| Example 13 | B | Emin-BF4 | 1008.48 | 41.52 |
| Example 14 | C | Emin-BF4 | 1022.56 | 27.44 |
| Example 15 | E | Emin-BF4 | 1043.48 | 6.52 |
| Example 16 | D | Emin-BF4 | 1032.50 | 17.5 |
| Example 17 | A | Emin-BF4 | 989.78 | 60.22 |
| Example 18 | A | [$N_{222}$][dimalonate] | 997.25 | 52.75 |
| Example 19 | A | Polyacrylate-35 | 995.72 | 54.28 |
| Example 20 | A | Polycarbonate | 1008.70 | 41.3 |

Table 43 shows that for a given air feed the furnace temperature is reduced in the presence of a sulfur dioxide enriched air stream from the membrane sweeping unit. Final design of the system can take into account the effect or potential effect on flame temperature and other parameters can be used to account for the decrease in flame temperature due to the presence of sulfur dioxide.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed:

1. A method for increasing sulfur recovery from an acid gas feed, the method comprising the steps of:
   introducing the acid gas feed and a sulfur dioxide enriched air stream to a Claus process to produce a product gas stream and a recovered sulfur stream, wherein the acid gas feed comprises hydrogen sulfide, wherein the hydrogen sulfide is present in a hydrogen sulfide concentration, wherein the sulfur dioxide enriched air stream comprises sulfur dioxide and air;
   introducing the product gas stream to a thermal oxidizer to produce a flue gas stream, the thermal oxidizer configured to convert sulfur containing compounds in the product gas stream to sulfur dioxide;
   cooling the flue gas stream in a cooler to produce a cooled take-off stream;
   separating the cooled take-off stream in a liquid-gas separation unit to produce a condensed water and a saturated gas stream, wherein the saturated gas stream comprises sulfur dioxide;
   heating the saturated gas stream in a heater to produce a membrane gas stream;
   introducing the membrane gas stream to a membrane sweeping unit, wherein the membrane sweeping unit comprises a membrane, wherein the membrane sweeping unit is configured to produce a sulfur dioxide depleted stream, wherein the sulfur dioxide in the membrane gas stream permeates the membrane of the membrane sweeping unit to a permeate side; and
   introducing a sweep air stream to the permeate side, wherein the sweep air stream collects the sulfur dioxide that permeates the membrane of the membrane sweeping unit to create the sulfur dioxide enriched air stream.

2. The method of claim 1, further comprising the step of feeding the sulfur dioxide depleted stream to an incinerator stack.

3. The method of claim 1, further comprising the steps of heating the sulfur dioxide depleted stream in a reheater to produce a heated stack feed, wherein the heated stack feed is at a stack temperature; and feeding the heated stack feed to an incinerator stack.

4. The method of claim 1, wherein the membrane is an [emim][BF4] ionic liquid supported on a polyethersulfone.

5. The method of claim 1, wherein the membrane is selected from the group consisting of polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117 (perfluorosulfonic acid), rubbery Nafion® (perfluorosulfonic acid), sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes.

6. The method of claim 1, wherein the hydrogen sulfide concentration is greater than 25%.

7. The method of claim 1, wherein a sulfur recovery is greater than 99.2 wt %.

8. An apparatus for increasing sulfur recovery from an acid gas feed, the apparatus comprising:

a Claus process, the Claus process configured to receive the acid gas feed and a sulfur dioxide enriched air stream to produce a product gas stream and a recovered sulfur stream, wherein the acid gas feed comprises hydrogen sulfide, wherein the hydrogen sulfide is present in a hydrogen sulfide concentration, wherein the sulfur dioxide enriched air stream comprises sulfur dioxide and air, wherein the product gas stream comprises sulfur containing compounds;

a thermal oxidizer, the thermal oxidizer configured to convert the sulfur containing compounds to sulfur dioxide to produce a flue gas stream, wherein the flue gas stream comprises sulfur dioxide, water vapor, oxygen, nitrogen, and carbon dioxide;

a cooler, the cooler configured to reduce the temperature of the flue gas stream below the dew point temperature of water to produce a cooled take-off stream;

a gas-liquid separator unit, the gas-liquid separator unit configured to condense the water vapor in the cooled take-off stream to produce a condensed water and a saturated gas stream, wherein the saturated gas stream comprises sulfur dioxide;

a heater, configured to heat the saturated gas stream to produce a membrane gas stream; and a membrane sweeping unit, wherein the membrane sweeping unit comprises a membrane, wherein the membrane sweeping unit is configured to produce a sulfur dioxide depleted stream, wherein the sulfur dioxide in the membrane gas stream permeates the membrane of the membrane sweeping unit to a permeate side, wherein a sweep air stream fed to the permeate side of the membrane sweeping unit is operable to collect the sulfur dioxide that permeates the membrane of the membrane sweeping unit to create the sulfur dioxide enriched air stream.

9. The apparatus of claim 8, further comprising an incinerator stack, the incinerator stack configured to disseminate the sulfur dioxide depleted stream to the atmosphere.

10. The apparatus of claim 8, wherein the membrane is an [emim][BF4] ionic liquid supported on a polyethersulfone.

11. The apparatus of claim 8, wherein the membrane is selected from the group consisting of polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117 (perfluorosulfonic acid), rubbery Nafion® (perfluorosulfonic acid), sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes.

12. The apparatus of claim 8, wherein the hydrogen sulfide concentration is greater than 25%.

13. The apparatus of claim 8, wherein a sulfur recovery is greater than 99.2 wt %.

14. The apparatus of claim 8, wherein the Claus process comprises a thermal stage and a catalytic stage.

\* \* \* \* \*